(12) United States Patent
Okuma et al.

(10) Patent No.: US 12,088,769 B2
(45) Date of Patent: Sep. 10, 2024

(54) INFORMATION PROCESSING SYSTEM FOR PERFORMING COLLECTION AND AGGREGATE CALCULATION OF OPERATION HISTORY DATA ABOUT PRINT PROCESSING IN A PRINTER

(71) Applicant: CANON KABUSHIKI KAISHA, Tokyo (JP)

(72) Inventors: Satoshi Okuma, Ibaraki (JP); Noritsugu Okayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/162,184

(22) Filed: Jan. 31, 2023

(65) Prior Publication Data

US 2023/0171359 A1   Jun. 1, 2023

Related U.S. Application Data

(63) Continuation of application No. 17/527,846, filed on Nov. 16, 2021, now Pat. No. 11,601,564.

(30) Foreign Application Priority Data

Nov. 27, 2020 (JP) ................................ 2020-197066
Nov. 27, 2020 (JP) ................................ 2020-197068
Nov. 27, 2020 (JP) ................................ 2020-197069
Sep. 2, 2021 (JP) ................................ 2021-142928

(51) Int. Cl.
  *H04N 1/00* (2006.01)

(52) U.S. Cl.
  CPC ..... *H04N 1/00824* (2013.01); *H04N 1/00013* (2013.01); *H04N 1/0005* (2013.01); *H04N 1/00068* (2013.01); *H04N 1/00079* (2013.01)

(58) Field of Classification Search
  CPC ............ H04N 1/00013; H04N 1/0005; H04N 1/00068; H04N 1/00079; H04N 1/00824; H04N 1/00015; H04N 1/00042; H04N 1/00071; H04N 1/00074; H04N 1/00076; H04N 1/00408; H04N 1/00477; H04N 1/00832; H04N 1/2392
  See application file for complete search history.

(56) References Cited

U.S. PATENT DOCUMENTS 5,729,351 A * 3/1998 Oh ........................ H04N 1/2307
  358/406
6,421,515 B1 * 7/2002 Arai ..................... H04N 1/00832
  399/175
7,191,028 B2 * 3/2007 Nomura ............. H04N 1/00832
  710/1

(Continued)

*Primary Examiner* — Scott A Rogers
(74) *Attorney, Agent, or Firm* — Canon U.S.A., Inc. IP Division

(57) ABSTRACT

An information processing system includes a reading device configured to perform reading processing for reading an original, and one or more controllers configured to function as an acquisition unit that acquires a number of processing operations per unit time period of the reading processing, and an acquisition unit that acquires operation rate information about the reading device based on the number of processing operations per unit time period of the reading processing and a predetermined number of processing operations of the reading processing.

11 Claims, 24 Drawing Sheets

(56) References Cited

U.S. PATENT DOCUMENTS

| | | | | |
|---|---|---|---|---|
| 8,271,904 B2* | 9/2012 | Konuma | ............ | H04N 1/00432 |
| | | | | 715/764 |
| 8,908,212 B2* | 12/2014 | Ikeuchi | ............. | H04N 1/00079 |
| | | | | 705/52 |
| 9,152,112 B2* | 10/2015 | Maeda | ................. | G03G 15/502 |
| 9,208,407 B2* | 12/2015 | Honda | ............. | G03G 15/5016 |
| 9,323,480 B2* | 4/2016 | Kyono | ................. | G06F 3/1273 |
| 9,473,662 B2* | 10/2016 | Nakatani | ........... | H04N 1/00244 |
| 9,538,026 B2* | 1/2017 | Maekawa | ............. | G06F 3/0484 |
| 9,840,105 B2* | 12/2017 | Kamisuwa | ............. | G06F 3/1222 |
| 11,797,804 B2* | 10/2023 | Kinoshita | ........... | H04N 1/00047 |
| 2009/0002748 A1* | 1/2009 | Yamada | ............ | G03G 15/5087 |
| | | | | 358/1.15 |
| 2009/0323085 A1* | 12/2009 | Dattilo | .................... | G06K 15/02 |
| | | | | 358/1.1 |
| 2010/0161363 A1* | 6/2010 | Nakane | ................ | G03G 15/502 |
| | | | | 358/1.9 |
| 2010/0177344 A1* | 7/2010 | Matsumoto | ........ | H04N 1/00344 |
| | | | | 358/1.15 |
| 2011/0154479 A1* | 6/2011 | Terabe | ................. | H04N 1/4413 |
| | | | | 726/16 |
| 2014/0023339 A1* | 1/2014 | Takahashi | ................ | H04N 9/79 |
| | | | | 386/230 |

\* cited by examiner

FIG.4A

| No. | EVENT NAME | DEVICE ID | OCCURRENCE TIME | JOB ID | EVENT ADDITIONAL INFORMATION ||||
|---|---|---|---|---|---|---|---|---|
| | | | | | JOB TYPE | PRINT COLOR MODE | NUMBER OF PRINTED SHEETS | SCAN COLOR MODE | NUMBER OF SCANNED PAGES |
| 1 | JobCompleted | AAA0001 | 2020/5/15 10:00 | 0100 | Copy | FullColor | 10 | FullColor | 2 |
| 2 | JobCompleted | BBB0100 | 2020/5/15 10:15 | 0030 | Print | FullColor | 3 | — | — |
| 3 | JobCompleted | AAA0001 | 2020/5/15 10:22 | 0101 | Copy | FullColor | 3 | FullColor | 3 |
| 4 | JobCompleted | CCC0200 | 2020/5/15 10:25 | 0500 | Send | — | — | MonoColor | 5 |
| 5 | JobCompleted | AAA0001 | 2020/5/15 10:40 | 0102 | Print | MonoColor | 1 | — | — |
| 6 | JobCompleted | CCC0200 | 2020/5/15 10:51 | 0501 | Send | — | — | MonoColor | 5 |
| 7 | JobCompleted | BBB0100 | 2020/5/15 10:55 | 0031 | Print | FullColor | 2 | — | — |

FIG.4B

| No. | EVENT NAME | DEVICE ID | OCCURRENCE TIME | EVENT ADDITIONAL INFORMATION ||||||
|---|---|---|---|---|---|---|---|---|---|
| | | | | PRINTER TYPE | RATED NUMBER OF COLOR PRINTED SHEETS | RATED NUMBER OF MONOCHROME PRINTED SHEETS | SCANNER TYPE | RATED NUMBER OF COLOR SCANNED PAGES | RATED NUMBER OF MONOCHROME SCANNED PAGES |
| 1 | BasicInfoSnapshotted | AAA0001 | 2020/4/1 8:30 | Color | 60 | 60 | Color | 60 | 60 |
| 2 | BasicInfoSnapshotted | BBB0100 | 2020/4/3 9:05 | Mono | — | 55 | Color | 50 | 55 |
| 3 | BasicInfoSnapshotted | CCC0200 | 2020/5/6 8:30 | Color | 50 | 50 | Color | 70 | 70 |

FIG.7

| No. | DEVICE ID 701 | PRINT OPERATION RATE 702 | SCAN OPERATION RATE 703 | MFP OPERATION RATE 704 | PRINT UTILIZATION RATE 705 | SCAN UTILIZATION RATE 706 |
|---|---|---|---|---|---|---|
| 1 | AAA0001 | 3.10% | 1.08% | 2.09% | 74.16% | 25.83% |
| 2 | BBB0100 | 4.24% | 0.22% | 2.23% | 95.06% | 4.93% |
| 3 | CCC0200 | 1.76% | 3.06% | 2.41% | 36.51% | 63.48% |

FIG.8

| No. | EVENT NAME | DEVICE ID | OCCURRENCE TIME | JOB ID | JOB TYPE | PRINT COLOR MODE | NUMBER OF PRINTED SHEETS | SCAN COLOR MODE | NUMBER OF SCANNED PAGES | PROCESSING EXECUTION TIME |
|---|---|---|---|---|---|---|---|---|---|---|
| 1 | JobCompleted | AAA0001 | 2020/5/15 10:00 | 0100 | Copy | FullColor | 10 | FullColor | 2 | — |
| 2 | JobCompleted | BBB0100 | 2020/5/15 10:15 | 0030 | Print | FullColor | 3 | — | — | — |
| 3 | JobCompleted | AAA0001 | 2020/5/15 10:16 | 0101 | FaxTrans | — | — | — | — | 0:01:11 |
| 4 | JobCompleted | AAA0001 | 2020/5/15 10:22 | 0102 | Copy | FullColor | 3 | FullColor | 3 | — |
| 5 | JobCompleted | BBB0100 | 2020/5/15 10:20 | 0031 | BoxSend | — | — | — | — | — |
| 6 | JobCompleted | CCC0200 | 2020/5/15 10:25 | 0500 | ScanSend | — | — | MonoColor | 5 | 0:00:35 |
| 7 | JobCompleted | AAA0001 | 2020/5/15 10:33 | 0103 | FaxTrans | — | — | — | — | 0:03:20 |
| 8 | JobCompleted | CCC0200 | 2020/5/15 10:38 | 0501 | ReceivBox | — | — | — | — | — |
| 9 | JobCompleted | AAA0001 | 2020/5/15 10:40 | 0104 | Print | MonoColor | 1 | — | — | — |
| 10 | JobCompleted | CCC0200 | 2020/5/15 10:51 | 0501 | ScanSend | — | — | MonoColor | 5 | — |
| 11 | JobCompleted | BBB0100 | 2020/5/15 10:55 | 0032 | Print | FullColor | 2 | — | — | — |
| 12 | JobCompleted | BBB0100 | 2020/5/15 11:08 | 0033 | ReceivBox | — | — | — | — | 0:03:11 |
| 13 | JobCompleted | AAA0001 | 2020/5/15 11:11 | 0105 | FaxTrans | — | — | — | — | 0:05:20 |

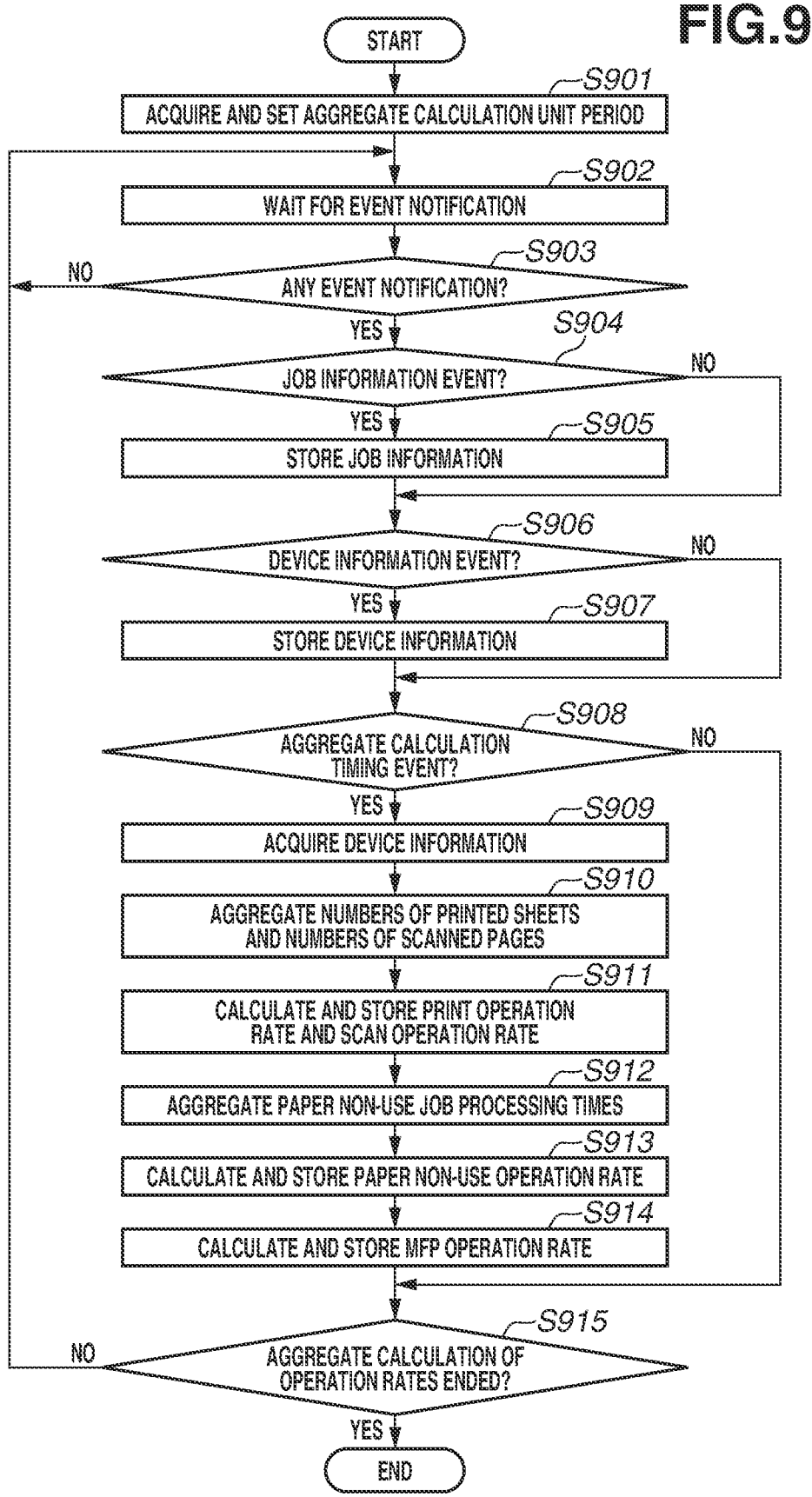

FIG.10

| No. | DEVICE ID | PRINT OPERATION RATE | SCAN OPERATION RATE | PAPER NON-USE OPERATION RATE | MFP OPERATION RATE | PRINT UTILIZATION RATE | SCAN UTILIZATION RATE | PAPER NON-USE UTILIZATION RATE |
|---|---|---|---|---|---|---|---|---|
| | *1001* | *1002* | *1003* | *1004* | *1005* | *1006* | *1007* | *1008* |
| 1 | AAA0001 | 3.10% | 1.08% | 1.04% | 1.74% | 59.38% | 20.68% | 19.92% |
| 2 | BBB0100 | 4.24% | 0.22% | 0.17% | 1.54% | 91.57% | 4.75% | 3.67% |
| 3 | CCC0200 | 1.76% | 3.06% | 0.23% | 1.68% | 34.85% | 60.59% | 4.55% |

FIG. 11A

| No. | EVENT NAME | DEVICE ID | OCCURRENCE TIME | EVENT ADDITIONAL INFORMATION ||||||
|---|---|---|---|---|---|---|---|---|
| | | | | JOB ID | JOB TYPE | PRINT COLOR MODE | NUMBER OF PRINTED PAGES | SCAN COLOR MODE | NUMBER OF SCANNED PAGES |
| 1 | JobCompleted | AAA0001 | 2020/5/15 10:00 | 0100 | Copy | FullColor | 10 | FullColor | 2 |
| 2 | JobCompleted | BBB0100 | 2020/5/15 10:15 | 0030 | Print | FullColor | 3 | -- | -- |
| 3 | JobCompleted | AAA0001 | 2020/5/15 10:22 | 0101 | Copy | FullColor | 3 | FullColor | 3 |
| 4 | JobCompleted | CCC0200 | 2020/5/15 10:25 | 0500 | Send | -- | -- | MonoColor | 5 |
| 5 | JobCompleted | AAA0001 | 2020/5/15 10:40 | 0102 | Print | MonoColor | 1 | -- | -- |
| 6 | JobCompleted | CCC0200 | 2020/5/15 10:51 | 0501 | Send | -- | -- | MonoColor | 5 |
| 7 | JobCompleted | BBB0100 | 2020/5/15 10:55 | 0031 | Print | FullColor | 2 | -- | -- |

FIG. 11B

| No. | EVENT NAME | DEVICE ID | OCCURRENCE TIME | EVENT ADDITIONAL INFORMATION |||||
|---|---|---|---|---|---|---|---|---|
| | | | | PRINTER TYPE | RATED NUMBER OF COLOR PRINTED PAGES | RATED NUMBER OF MONOCHROME PRINTED PAGES | SCANNER TYPE | RATED NUMBER OF COLOR SCANNED PAGES | RATED NUMBER OF MONOCHROME SCANNED PAGES |
| 1 | BasicInfoSnapshotted | AAA0001 | 2020/4/1 8:30 | Color | 60 | 60 | Color | 60 | 60 |
| 2 | BasicInfoSnapshotted | BBB0100 | 2020/4/3 9:05 | Mono | -- | 55 | Color | 50 | 55 |
| 3 | BasicInfoSnapshotted | CCC0200 | 2020/5/6 8:30 | Color | 50 | 50 | Color | 70 | 70 |

FIG.11C

| No. | EVENT NAME | EVENT ADDITIONAL INFORMATION | | STATUS |
|---|---|---|---|---|
| | | DEVICE ID | OCCURRENCE TIME | |
| 1 | StatusChanged | AAA0001 | 2020/5/15 10:00 | Standby |
| 2 | StatusChanged | BBB0100 | 2020/5/15 10:15 | Malfunction |
| 3 | StatusChanged | AAA0001 | 2020/5/15 10:16 | PrinterJam |
| 4 | StatusChanged | AAA0001 | 2020/5/15 10:22 | Malfunction |
| 5 | StatusChanged | BBB0100 | 2020/5/15 10:20 | Standby |
| 6 | StatusChanged | CCC0200 | 2020/5/15 10:25 | Standby |
| 7 | StatusChanged | AAA0001 | 2020/5/15 10:33 | Standby |
| 8 | StatusChanged | CCC0200 | 2020/5/15 10:25 | Standby |
| 9 | StatusChanged | AAA0001 | 2020/5/15 10:40 | NoToner |
| 10 | StatusChanged | CCC0200 | 2020/5/15 10:51 | PrinterJam |
| 11 | StatusChanged | BBB0100 | 2020/5/15 10:55 | PrinterJam |
| 12 | StatusChanged | BBB0100 | 2020/5/15 11:08 | Standby |
| 13 | StatusChanged | AAA0001 | 2020/5/15 11:11 | Standby |

| No. | DEVICE ID | PRINTER EFFECTIVE OPERATION RATE | PRINTER EFFECTIVE TIME RATE |
|---|---|---|---|
| 1 | AAA0001 | 3.10% | 90.00% |
| 2 | BBB0100 | 5.00% | 50.00% |
| 3 | CCC0200 | 2.76% | 100.00% |

FIG.15

| No. | EVENT NAME | EVENT ADDITIONAL INFORMATION | | UNIT | STATUS |
| --- | --- | --- | --- | --- | --- |
| | | DEVICE ID | OCCURRENCE TIME | | |
| 1 | statusChanged | AAA0001 | 2020/5/15 10:00 | Scanner | Standby |
| 2 | statusChanged | BBB0100 | 2020/5/15 10:15 | Printer | Malfunction |
| 3 | statusChanged | AAA0001 | 2020/5/15 10:16 | Printer | Standby |
| 4 | statusChanged | AAA0001 | 2020/5/15 10:22 | Printer | Malfunction |
| 5 | statusChanged | BBB0100 | 2020/5/15 10:20 | Printer | Standby |
| 6 | statusChanged | CCC0200 | 2020/5/15 10:25 | Printer | Standby |
| 7 | statusChanged | AAA0001 | 2020/5/15 10:33 | Printer | Standby |
| 8 | statusChanged | CCC0200 | 2020/5/15 10:25 | Scanner | Standby |
| 9 | statusChanged | AAA0001 | 2020/5/15 10:40 | Printer | NoToner |
| 10 | statusChanged | CCC0200 | 2020/5/15 10:51 | Scanner | ScannerJam |
| 11 | statusChanged | BBB0100 | 2020/5/15 10:55 | Printer | PrinterJam |
| 12 | statusChanged | BBB0100 | 2020/5/15 11:08 | Printer | Standby |
| 13 | statusChanged | AAA0001 | 2020/5/15 11:11 | Printer | Standby |

FIG.17

| No. | DEVICE ID 11001 | PRINTER EFFECTIVE OPERATION RATE 11002 | PRINTER EFFECTIVE TIME RATE 11003 | SCANNER EFFECTIVE OPERATION RATE 11004 | SCANNER EFFECTIVE TIME RATE 11005 | MFP EFFECTIVE OPERATION RATE 11006 | MFP EFFECTIVE TIME RATE 11007 |
|---|---|---|---|---|---|---|---|
| 1 | AAA0001 | 2.00% | 98.00% | 1.00% | 95.00% | 3.00% | 96.50% |
| 2 | BBB0100 | 5.00% | 97.00% | — | — | 5.00% | 97.00% |
| 3 | CCC0200 | 0.10% | 50.00% | 3.00% | 100.00% | 3.10% | 75.00% |

FIG.18A

| No. | EVENT NAME | DEVICE ID | OCCURRENCE TIME | EVENT ADDITIONAL INFORMATION ||||  |
|---|---|---|---|---|---|---|---|---|
| | | | | JOB ID | JOB TYPE | PRINT COLOR MODE | NUMBER OF PRINTED SHEETS | PRINT SPEED |
| 1 | JobCompleted | AAA0001 | 2020/5/15 10:00 | 0100 | Copy | FullColor | 10 | 60 |
| 2 | JobCompleted | BBB0100 | 2020/5/15 10:15 | 0030 | Print | MonoColor | 3 | 50 |
| 3 | JobCompleted | AAA0001 | 2020/5/15 10:22 | 0101 | Copy | FullColor | 3 | 30 |
| 4 | JobCompleted | CCC0200 | 2020/5/15 10:25 | 0500 | Copy | FullColor | 5 | 50 |
| 5 | JobCompleted | AAA0001 | 2020/5/15 10:40 | 0102 | Print | MonoColor | 1 | 60 |
| 6 | JobCompleted | CCC0200 | 2020/5/15 10:51 | 0501 | Copy | MonoColor | 7 | 55 |
| 7 | JobCompleted | BBB0100 | 2020/5/15 10:55 | 0031 | Print | MonoColor | 2 | 50 |

FIG.18B

| No. | EVENT NAME | DEVICE ID | OCCURRENCE TIME | EVENT ADDITIONAL INFORMATION |||
|---|---|---|---|---|---|---|
| | | | | PRINTER TYPE | RATED NUMBER OF COLOR PRINTED SHEETS | RATED NUMBER OF MONOCHROME PRINTED SHEETS |
| 1 | BasicInfoSnapshotted | AAA0001 | 2020/4/1 8:30 | Color | 60 | 60 |
| 2 | BasicInfoSnapshotted | BBB0100 | 2020/4/3 9:05 | Mono | — | 50 |
| 3 | BasicInfoSnapshotted | CCC0200 | 2020/5/6 8:30 | Color | 50 | 55 |

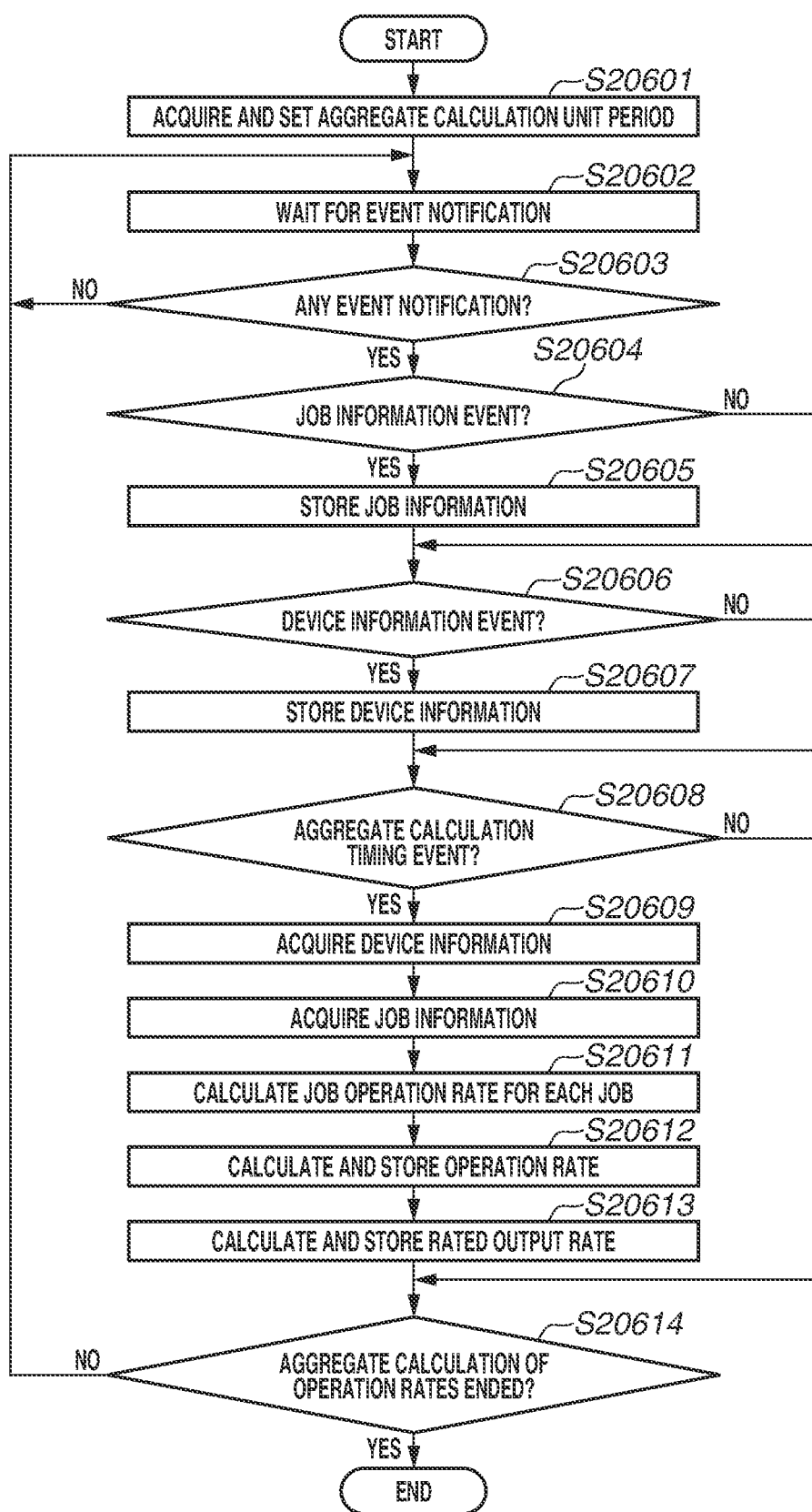

FIG.20

| No. | DEVICE ID 20701 | NUMBER OF COLOR PRINTED SHEETS 20702 | NUMBER OF MONOCHROME PRINTED SHEETS 20703 | RATED NUMBER OF COLOR PRINTED SHEETS 20704 | RATED NUMBER OF MONOCHROME PRINTED SHEETS 20705 | OPERATION RATE 20706 | RATED OUTPUT RATE 20707 | RATED OPERATION RATE 20708 |
|---|---|---|---|---|---|---|---|---|
| 1 | AAA0001 | 4,312 | 11,312 | 60 | 60 | 4.21% | 73.6% | 3.10% |
| 2 | BBB0100 | — | 17,094 | — | 50 | 4.07% | 100.0% | 4.07% |
| 3 | CCC0200 | 1,386 | 6,608 | 50 | 55 | 3.52% | 50.0% | 1.76% |

FIG.21

| No. | EVENT NAME | DEVICE ID | OCCURRENCE TIME | JOB ID | JOB TYPE | PRINT COLOR MODE | NUMBER OF PRINTED SHEETS | PRINT SPEED | SECOND PRINT COLOR MODE | NUMBER OF SECOND PRINTED SHEETS | SECOND PRINT SPEED |
|---|---|---|---|---|---|---|---|---|---|---|---|
| | | | | | | EVENT ADDITIONAL INFORMATION | | | | | |
| 1 | JobCompleted | AAA0001 | 2020/5/15 10:00 | 0100 | Copy | FullColor | 10 | 60 | — | — | — |
| 2 | JobCompleted | BBB0100 | 2020/5/15 10:15 | 0030 | Print | MonoColor | 3 | 50 | — | — | — |
| 3 | JobCompleted | AAA0001 | 2020/5/15 10:16 | 0101 | Print | FullColor | 2 | 60 | FullCoor | 2 | 30 |
| 4 | JobCompleted | AAA0001 | 2020/5/15 10:22 | 0102 | Copy | FullColor | 3 | 30 | — | — | — |
| 5 | JobCompleted | BBB0100 | 2020/5/15 10:20 | 0031 | Copy | MonoColor | 5 | 50 | — | — | — |
| 6 | JobCompleted | CCC0200 | 2020/5/15 10:25 | 0500 | Print | FullColor | 3 | 25 | MonoColor | 2 | 27.5 |
| 7 | JobCompleted | AAA0001 | 2020/5/15 10:33 | 0103 | Print | FullColor | 2 | 60 | FullCoor | 2 | 30 |
| 8 | JobCompleted | CCC0200 | 2020/5/15 10:38 | 0501 | Print | FullColor | 3 | 50 | MonoColor | 3 | 27.5 |
| 9 | JobCompleted | AAA0001 | 2020/5/15 10:40 | 0104 | Print | MonoColor | 1 | 30 | — | — | — |
| 10 | JobCompleted | CCC0200 | 2020/5/15 10:51 | 0501 | Print | MonoColor | 3 | 25 | MonoColor | 3 | 13.75 |
| 11 | JobCompleted | BBB0100 | 2020/5/15 10:55 | 0032 | Print | MonoColor | 2 | 50 | — | — | — |
| 12 | JobCompleted | BBB0100 | 2020/5/15 11:08 | 0033 | Copy | MonoColor | 1 | 50 | — | — | — |
| 13 | JobCompleted | AAA0001 | 2020/5/15 11:11 | 0105 | Print | FullColor | 2 | 30 | MonoColor | 2 | 30 |

FIG.23

| No. | DEVICE ID 21001 | NUMBER OF COLOR PRINTED SHEETS 21002 | NUMBER OF MONOCHROME PRINTED SHEETS 21003 | RATED NUMBER OF COLOR PRINTED SHEETS 21004 | RATED NUMBER OF MONOCHROME PRINTED SHEETS 21005 | OPERATION RATE 21006 | RATED OUTPUT RATE 21007 | RATED OPERATION RATE 21008 |
|---|---|---|---|---|---|---|---|---|
| 1 | AAA0001 | 4,312 | 11,312 | 60 | 60 | 4.21% | 73.6% | 3.10% |
| 2 | BBB0100 | — | 17,094 | — | 50 | 4.07% | 100.0% | 4.07% |
| 3 | CCC0200 | 1,386 | 6,608 | 50 | 55 | 4.40% | 40.0% | 1.76% | ously.

INFORMATION PROCESSING SYSTEM FOR PERFORMING COLLECTION AND AGGREGATE CALCULATION OF OPERATION HISTORY DATA ABOUT PRINT PROCESSING IN A PRINTER

CROSS REFERENCE OF RELATED APPLICATIONS

This application is a Continuation of U.S. patent application Ser. No. 17/527,846 filed Nov. 16, 2021 which claims the benefit of Japanese Patent Applications No. 2020-197066 filed Nov. 27, 2020, No. 2020-197068 filed Nov. 27, 2020, No. 2020-197069 filed Nov. 27, 2020, and No. 2021-142928 filed Sep. 2, 2021, each of which are hereby incorporated by reference herein in their entirety.

BACKGROUND

Field of the Disclosure

Aspects of the present disclosure generally relate to an information processing system using an image processing apparatus including an image forming device which forms an image on a sheet or a reading device which reads an original and, more particularly, to an information processing system which performs collection and aggregate calculation of operation history data about the image processing apparatus. The information processing system is used as a printer, a facsimile (FAX) apparatus, a scanner, and a multifunction peripheral including their functions.

Description of the Related Art

Heretofore, there has been known a service which analyzes an operation status of an image forming apparatus, such as a printer, a copying machine, or a multifunction peripheral, installed at a customer and, for example, proposes selection of a model suitable for the customer's environment and a manner of operation thereof based on a result of the analysis. Japanese Patent Application Laid-Open No. 2011-65438 discusses a technique to calculate, as information available for analysis of the operation status, an operation time by obtaining a job execution time from the time of start of a job to the time of end thereof.

Moreover, the Ministry of the Environment's guideline sets forth a method of obtaining an operation rate of, for example, a printer or multifunction peripheral as follows with regard to a method that is based on the number of output sheets:

> Operation rate=(Monthly number of output sheets)/
> (Number of output sheets per minute×60 minutes×7 hours×20 days).

Here, as the number of output sheets per minute, for example, a rated value set forth in a brochure of the applicable apparatus is used. Moreover, the terms "60 minutes×7 hours×20 days" are presumed to be values associated with approximate actual working hours. In the case of providing a service that is based on an operation rate to various models, it is desirable not to calculate the operation rate with a unique method such as that discussed in Japanese Patent Application Laid-Open No. 2011-65438 but to, in consideration of the compatibility of information, calculate the operation rate with a method that is based on the number of output sheets in line with the Ministry of the Environment's guideline.

The method of calculation of an operation rate set forth in the Ministry of the Environment's guideline has room for improvement in various issues.

The first example of an issue for improvement is that, although the number of print processing operations is taken into account, the number of original reading processing operations is not taken into account. In these days when there are growing calls for digitization of documents, the usage frequency of functions of storing an image read from an original and attaching such an image to an e-mail is becoming higher. Therefore, in an information processing system using a copying machine or a multifunction peripheral, it is desirable to obtain an operation rate that is based on the number of original reading processing operations with a method similar to the method of calculation of an operation rate that is based on the number of print processing operations by reference to the Ministry of the Environment's guideline.

The second example of an issue for improvement is that the actual working hours are associated with only approximate values. The reason for this is that the above-mentioned values are based on the premise that the apparatus is operating normally and a time period in which the apparatus is unavailable due to, for example, a malfunction thereof is not taken into account. Usually, while, as the operation rate of an apparatus is higher, an index indicating the need for usage being higher is obtained, the operation rate calculated in the above-mentioned method may take a lower value without regard for the need for usage when the apparatus is malfunctioning. Therefore, in the case of using an operation rate calculated in the above-mentioned method, the information processing system may not be able to provide an appropriate service to the user.

The third example of an issue for improvement is that, since a value set forth in a brochure is assumed to be used as the number of output sheets, a case of using a processing speed different from the standard speed is not taken into account. For example, there is a case where, depending on a type of paper, such as the size or thickness of paper for use in printing, or a special layout setting, such as bookbinding, printing is performed at a processing speed set lower than a rated value. In this way, in a printer in which printing was performed a large number of times at a processing speed set lower than the rated value, although, actually, the printer has been operating for a long time, the apparent operation rate may decrease. Accordingly, in the case of using an operation rate calculated in the above-mentioned method, the information processing system may not be able to provide an appropriate service to the user.

SUMMARY

An aspect of the present disclosure is generally directed to providing an information processing system capable of acquiring an appropriate operation rate.

Another aspect of the present disclosure is generally directed to providing an information processing system capable of acquiring an operation rate based on the number of original reading processing operations.

Yet another aspect of the present disclosure is generally directed to providing an information processing system capable of acquiring an operation rate obtained with a downtime of an apparatus taken into account.

Still yet another aspect of the present disclosure is generally directed to providing an information processing system capable of acquiring an operation rate associated with a type of image formation.

According to an aspect of the present disclosure, an information processing system includes a reading device configured to perform reading processing for reading an original, and one or more controllers configured to function as an acquisition unit that acquires a number of processing operations per unit time period of the reading processing, and an acquisition unit that acquires operation rate information about the reading device based on the number of processing operations per unit time period of the reading processing and a predetermined number of processing operations of the reading processing.

Further features of the present disclosure will become apparent from the following description of exemplary embodiments with reference to the attached drawings.

BRIEF DESCRIPTION OF THE DRAWINGS

FIGS. 4A and 4B are explanatory diagrams illustrating examples of notification events which are transmitted from the MFP to the server according to one or more aspects of the present disclosure.

FIG. 7 is a diagram illustrating examples of operation rates which the server displays according to one or more aspects of the present disclosure.

FIG. 8 is an explanatory diagram illustrating examples of notification events which are transmitted from the MFP to the server according to one or more aspects of the present disclosure.

FIG. 9 is a flowchart illustrating processing which the server performs according to one or more aspects of the present disclosure.

FIG. 10 is a diagram illustrating examples of operation rates which the server displays according to one or more aspects of the present disclosure.

FIG. 11A is a diagram illustrating examples of notification events which are transmitted from the MFP to the server according to one or more aspects of the present disclosure. FIG. 11B is a diagram illustrating examples of notification events which are transmitted from the MFP to the server according to one or more aspects of the present disclosure. FIG. 11C is a diagram illustrating examples of notification events which are transmitted from the MFP to the server according to one or more aspects of the present disclosure.

FIG. 14 is a diagram illustrating examples of operation rates which the server displays according to one or more aspects of the present disclosure.

FIG. 15 is an explanatory diagram illustrating examples of notification events which are transmitted from the MFP to the server according to one or more aspects of the present disclosure.

FIG. 17 is a diagram illustrating examples of effective operation rates which the server displays according to one or more aspects of the present disclosure.

FIGS. 18A and 18B are explanatory diagrams illustrating examples of notification events which are transmitted from the MFP to the server according to one or more aspects of the present disclosure.

FIG. 19 is a flowchart illustrating processing which the server performs according to one or more aspects of the present disclosure.

FIG. 20 is a diagram illustrating examples of operation information which the server displays according to one or more aspects of the present disclosure.

FIG. 21 is an explanatory diagram illustrating examples of notification events which are transmitted from the MFP to the server according to one or more aspects of the present disclosure.

FIG. 23 is a diagram illustrating examples of operation information which the server displays according to one or more aspects of the present disclosure.

DESCRIPTION OF THE EMBODIMENTS

Various exemplary embodiments, features, and aspects of the disclosure will be described in detail below with reference to the drawings. Furthermore, the scope of the present disclosure is not limited to configurations described in exemplary embodiments. Alterations such as substitution of a part of each configuration with an equivalent thereof and omission of a part of each processing can be performed within a range in which similar advantageous effects are able to be attained.

<Information Processing System>

Figure 1:
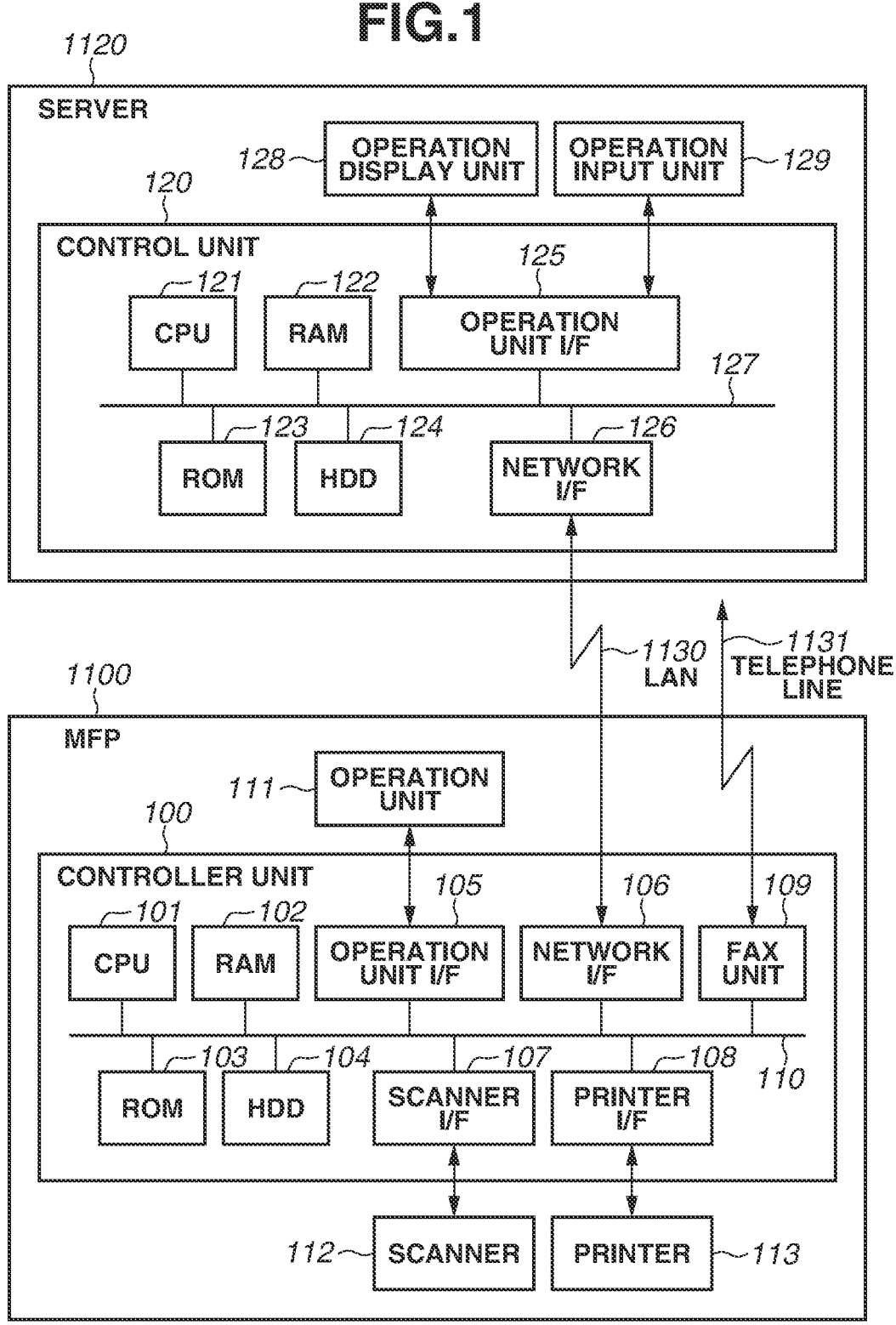
FIG. 1 is a diagram illustrating a configuration of the whole of an information processing system according to one or more aspects of the present disclosure.

FIG. 1 is a diagram illustrating a configuration of the whole of an information processing system according to a first exemplary embodiment. In the information processing system illustrated in FIG. 1, a server 1120 and a multifunction peripheral (MFP) 1100 are interconnected in such a way as to be able to communicate with each other via a network such as a local area network (LAN) 1130. In the first exemplary embodiment, the MFP 1100 stores log information in association with execution of a job, and transmits the stored log information to the server 1120. The server 1120 performs calculation of an operation rate about the MFP 1100 based on the received log information. Information about the calculated operation rate is used to provide various services such as a maintenance service for apparatuses and a selection service for an alternate model.

<MFP 1100>

The MFP 1100 is an image processing apparatus capable of performing various processing operations related to images. The MFP 1100 functions as an image forming apparatus, which forms an image on a sheet, and also functions as an image reading apparatus, which reads an original to acquire an image. The MFP 1100 includes a scanner 112, a printer 113, an operation unit 111, and a controller unit 100.

The controller unit 100 is a control unit which performs various control operations while communicating with the operation unit 111, the scanner 112, and the printer 113. The controller unit 100 includes a central processing unit (CPU) 101, a random access memory (RAM) 102, a read-only memory (ROM) 103, a hard disk drive (HDD) 104, an operation unit interface (I/F) 105, a network I/F 106, a scanner I/F 107 a printer I/F 108, and a facsimile (FAX) unit 109. These components are interconnected in such a way as to be able to communicate with each other via a system bus 110.

The CPU 101 is a processing unit which performs various information processing operations such as execution of a control program. The CPU 101 starts up the MFP 1100 based on a boot program stored in the ROM 103. Moreover, the CPU 101 reads out a control program stored in the HDD 104 and uses the RAM 102 as a work area.

The HDD 104 stores various control programs including functions such as copying and printing, and also stores data read from the scanner 112.

The operation unit I/F 105 performs data input and output communication control with respect to the operation unit 111.

The network I/F 106 is connected to the LAN 1130 and performs input and output control of information via the LAN 1130.

The scanner I/F 107 receives, as an input, image data from the scanner 112 and performs inputting and outputting of scanner control data.

The printer I/F 108 outputs image data to the printer 113 and performs inputting and outputting of printer control data.

The FAX unit 109 performs transmission and reception of facsimile data via a telephone line 1131.

The operation unit 111 is an interface which includes an input device, such as a touch panel or hardware keys, and a display device, such as a liquid crystal display (LCD) or a light-emitting diode (LED), and performs inputting of an instruction from the user and displaying of information to the user.

The scanner 112 is a reading device which includes an optical reading device, such as a charge-coupled device (CCD) sensor, and has the function of optically scanning and reading a paper medium to acquire electronic image data (being able to perform reading processing). Moreover, the scanner 112 has the function of causing an automatic document feeder (ADF) to automatically feed a stack of paper documents placed on a document tray on a sheet-by-sheet basis to the optical reading device and discharging each document sheet after completion of document reading. The number of document sheets which are able to be read by the ADF per minute is previously determined as a rated speed of the ADF. Usually, the ADF has two types of rated speeds including a speed for performing reading as a monochrome document and a speed for performing reading as a color document.

The printer 113 is an image forming device (printing device) having the function of forming electronic image data as an image on a recording medium such as a sheet of paper (being able to perform image forming processing). The number of sheets of a recording medium which are able to be used for printing per minute is previously determined as a rated speed for the printer 113. Usually, the printer 113 has two types of rated speeds including a speed for performing printing as a monochrome image and a speed for performing printing as a color image. Usually, the rated speed of the printer 113 represents the number of sheets which are able to be used for printing when printing is performed on sheets of the standard paper size and paper type. In a case where printing is performed on sheets of the size larger than the standard paper size, the number of sheets which are able to be used for printing per minute becomes smaller than the number of sheets which are able to be used for printing at the rated speed. Additionally, in a case where printing is performed on sheets of a special type, such as thick paper or thin paper, the printing speed may be set lower so as to completely fix the entire image such as a toner image to each sheet or prevent any smudge of each sheet. Therefore, the number of sheets which are able to be used for printing per minute may become smaller than the number of sheets which are able to be used for printing at the rated speed.

Moreover, the MFP 1100 has a send function which transmits image data read by the scanner 112 to another information processing apparatus through a network via the network I/F 106 according to a transmission protocol such as e-mail or Server Message Block (SMB). Additionally, the MFP 1100 has a print function which receives electronic image data from an information processing apparatus such as a personal computer (PC) through a network via the LAN 1130 and causes the printer 113 to print the received electronic document. Besides, the MFP 1100 has, for example, a FAX transfer function, a box storage function, and a box document transmission function. The FAX transfer function is a function of performing data transfer of image data for facsimile received by the FAX unit 109 via the telephone line 1131 to another information processing apparatus via the network I/F 106. The box storage function is a function of receiving image data from an information processing apparatus such as a PC via a network and storing the received image data in the HDD 104. The box document transmission function is a function of transmitting image data stored in the HDD 104 to another information processing apparatus through a network via the network I/F 106 according to the above-mentioned transmission protocol such as e-mail or SMB.

In this way, the MFP 1100 receives or acquires pieces of image data of various forms via, for example, the scanner 112, the network I/F 106, and the FAX unit 109. Additionally, the MFP 1100 is able to perform processing operations such as printing by the printer 113, transmission to another apparatus via the network I/F 106, and storing in the HDD 104.

Moreover, when having performed processing such as copying or printing, the MFP 1100 stores, for example, a result of execution of the processing as log information in the HDD 104.

The log information stored in the HDD 104 is transmitted to an apparatus located outside the MFP 1100 via the network I/F 106 immediately after execution of the processing or at intervals of a predetermined time.

Figure 2:
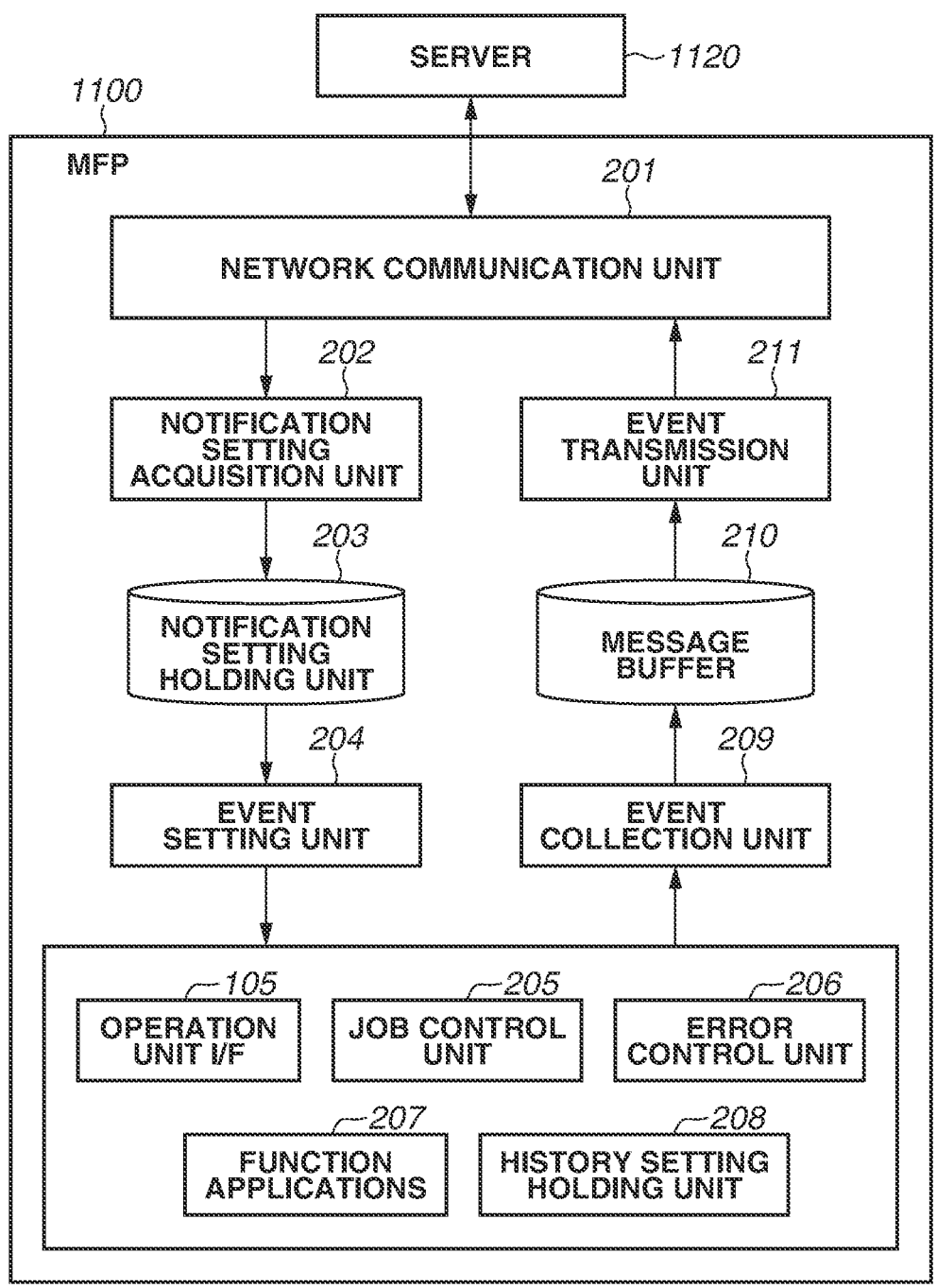
FIG. 2 is a diagram illustrating a software configuration of a multifunction peripheral (MFP) according to one or more aspects of the present disclosure.

FIG. 2 is a diagram illustrating a software configuration of the MFP 1100. These pieces of software included in the MFP 1100 are stored in any of the RAM 102, the ROM 103, and the HDD 104, and are executed by the CPU 101. Moreover, in the MFP 1100, pieces of software which implement scanning, printing, and various functions using a network or memory storage operate.

The operation unit I/F 105 has been described above as a hardware configuration, but is illustrated in FIG. 2 as a control program thereof. The operation unit I/F 105 has the function of displaying a screen via which the user performs an operation on the operation unit 111 or communicating, to function applications 207, the content of an operation which the user has performed.

The function applications 207 are software which causes functions, such as copying, printing, send, and FAX transmission and reception, to operate and includes a plurality of function applications for the respective functions.

Such a plurality of function applications is triggered by, for example, an instruction from the user via the operation unit 111 or a data reception via a network such as the LAN 1130 to cause application functions to operate.

A job control unit 205 receives a job execution instruction from the function applications 207 and then controls the scanner 112 or the printer 113 via the scanner I/F 107 or the printer I/F 108 to perform scanning or printing.

An error control unit 206 mainly receives a notification of an abnormal state occurring at, for example, the job control unit 205, the printer 113, or the scanner 112 and performs control such as stopping of the whole system or giving an instruction for a degeneracy operation.

A history setting holding unit 208 manages non-volatile information such as operation histories or various setting values in the MFP 1100.

The history setting holding unit 208 holds settings required for control of the MFP 1100 and control for execution of a job and stores, for example, an operation history of the user, a result of execution of a job, and any occurrence of an error. The substance of the non-volatile information is held in the HDD 104.

A network communication unit 201 performs transmission and reception of information via a network such as the LAN 1130 with respect to the server 1120.

First, the network communication unit 201 receives a setting for event notification from the server 1120. The setting for event notification is an instruction indicating what type of event information is to be communicated from the MFP 1100 to the server 1120. Specifically, the instruction indicates an event information type such as event information concerning job execution or event information concerning error.

Upon receiving the setting for event notification, the network communication unit 201 stores the received setting for event notification in a notification setting holding unit 203 via a notification setting acquisition unit 202. The event notification setting is stored as a file in the HDD 104 serving as the notification setting holding unit 203. Information to be stored in the notification setting holding unit 203 is a content indicating what event to transmit among phenomena which occur in the MFP 1100 and are able to be converted into events.

When the MFP 1100 has been started up or when a notification of change of an event notification setting stored in the notification setting holding unit 203 has been received via the notification setting acquisition unit 202, an event setting unit 204 performs acquisition setting of an event designated to be communicated as a notification with respect to each control unit and application. Thus, the event setting unit 204 performs settings to cause the operation unit I/F 105 and each of function modules including the job control unit 205 to the history setting holding unit 208 to communicate a notification of an event concerning the received acquisition notification.

An event collection unit 209 receives an event from each function module to which acquisition of an event has been set, selects and adds event information to the event, then performs shaping of data about such information, and stores the shaped data as event notification data in a message buffer 210. An example of the content of the event notification data is described below.

The message buffer 210 stores event notification data as a file stored in the HDD 104.

An event transmission unit 211 detects that event notification data has been written into the message buffer 210, reads out the event notification data, and transmits the event notification data to the server 1120 via the network communication unit 201. At this time, the event transmission unit 211 can transmit event notification data stored in the message buffer 210 each time the event notification data has been written into the message buffer 210 or can collectively transmit pieces of event notification data after the pieces of event notification data have been written up to a given degree of size.

<Server 1120>

The server 1120 is connected to the MFP 1100 via a network such as the LAN 1130, and is an information processing apparatus which requests a log from the MFP 1100 and receives the log therefrom. The server 1120 includes a control unit 120, an operation display unit 128, and an operation input unit 129.

The control unit 120 includes a CPU 121, which executes various control programs, and controls an operation of the entire server 1120. The control unit 120 includes the CPU 121, a RAM 122, a ROM 123, an HDD 124, an operation unit I/F 125, and a network I/F 126. Such components are interconnected in such a way as to be able to communicate with each other via a system bus 127.

The CPU 121 reads out a control program stored in the ROM 123 or the HDD 124, and performs predetermined processing with the RAM 122 used as a work area.

The HDD 124 stores various control programs such as an aggregate calculation control program for transmission logs received from the MFP 1100. Moreover, the HDD 124 also stores information about apparatuses corresponding to a plurality of MFPs 1100.

The network I/F 126 performs input and output control of information via the LAN 1130.

The operation unit I/F 125 performs communication control for outputting data to the operation display unit 128 and communication control for inputting data from the operation input unit 129.

The operation display unit 128 is an interface for displaying to the user, and includes a display device such as an LCD or LED.

The operation input unit 129 is an interface for inputting an instruction from the user, and includes an input device such as a keyboard and a mouse.

Figure 3:
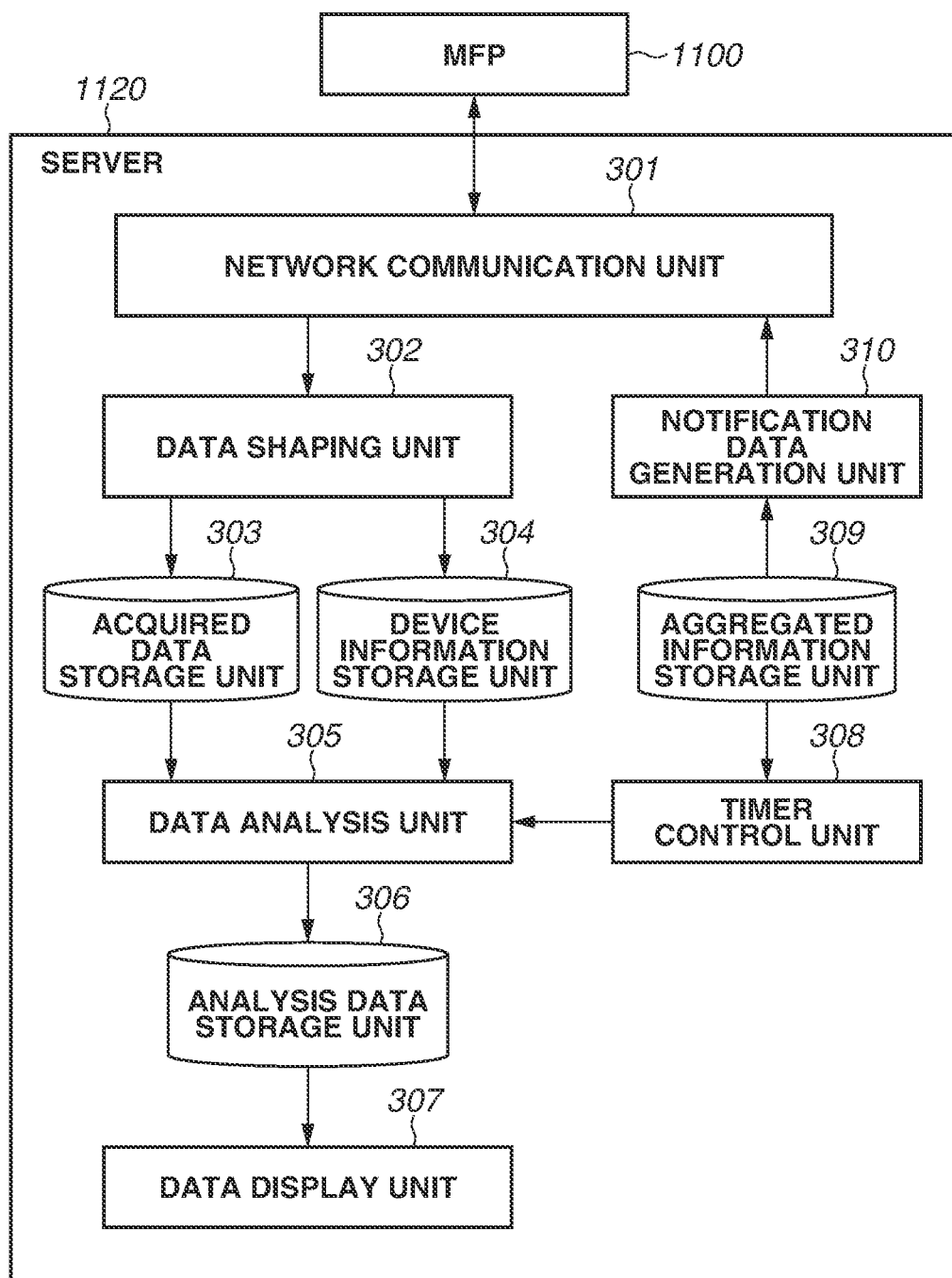
FIG. 3 is a diagram illustrating a software configuration of a server according to one or more aspects of the present disclosure.

FIG. 3 is a diagram illustrating a software configuration of the server 1120. These pieces of software included in the server 1120 are stored in any of the RAM 122, the ROM 123, and the HDD 124 and are executed by the CPU 121.

A network communication unit 301 performs transmission and reception of information with respect to the MFP 1100 via a network such as the LAN 1130. Moreover, the network communication unit 301 transmits information about settings for the respective event notification types to the MFP 1100.

A data shaping unit 302 interprets the content of event information received from the MFP 1100 via the network communication unit 301, then shapes such data, and stores the shaped data in an acquired data storage unit 303. Moreover, in a case where the received event information is information related to devices of the MFP 1100, the data shaping unit 302 stores device IDs for identifying the respective devices as well as the shaped data in the device information storage unit 304.

The acquired data storage unit 303 stores respective pieces of event information received from a plurality of MFPs 1100.

A device information storage unit 304 stores information related to devices received from a plurality of MFPs 1100. The information related to devices includes a rated print speed and a rated scan speed of the MFP 1100. The device information about the MFP 1100 does not necessarily need to be received from the MFP 1100 but can be data input via the operation input unit 129 as long as it is information which is uniquely determined by, for example, a device type.

A data analysis unit 305 aggregates and analyzes data at analysis timing communicated from a timer control unit 308 based on data stored in the acquired data storage unit 303 and the device information storage unit 304, thus calculating analysis data such as operation rates of devices. Additionally, the data analysis unit 305 stores the calculated analysis data in an analysis data storage unit 306.

The analysis data storage unit 306 stores various pieces of data such as operation rates of devices calculated by the data analysis unit 305.

A data display unit 307 acquires analysis data stored in the analysis data storage unit 306, shapes the analysis data, and then displays the shaped analysis data on, for example, the operation display unit 128.

The timer control unit 308 acquires data about, for example, an analysis interval stored in an aggregated information storage unit 309, and issues an instruction to the data analysis unit 305 to perform analysis at every analysis interval.

The aggregated information storage unit 309 stores information indicating at what degree of time interval the data analysis unit 305 analyzes the received acquired data. Usually, the aggregated information storage unit 309 stores a value indicating every month or every three months.

Moreover, the aggregated information storage unit 309 also stores information identifying MFPs 1100 targeted for aggregate calculation and analysis target data types indicating what information to analysis about each MFP 1100, i.e., what information to acquire from each MFP 1100.

A notification data generation unit 310 generates designation data for designating the type of event information which the MFP 1100 communicates to the server 1120, from the analysis target data types stored in the aggregated information storage unit 309. Additionally, the notification data generation unit 310 instructs the network communication unit 301 to transmit the event type designation data to the target MFP 1100.

<Notification Events>

FIGS. 4A and 4B are diagrams schematically illustrating example of notification events which are transmitted from the MFP 1100 to the server 1120. Here, two types of notification events among the notification events which are transmitted from the MFP 1100 to the server 1120 are described with reference to FIGS. 4A and 4B.

FIG. 4A illustrates examples of notification events which are recorded when various types of jobs have been completed in the MFP 1100 and are transmitted to the server 1120. While an actual notification event is data which is transmitted in a format such as JavaScript Object Notation (JSON) or Extensible Markup Language (XML), here, for ease of explanation, the content of data is expressed in tabular form. Each row represents one notification event.

An information column "event name" 401 represents the name of an event which is transmitted. A "JobCompleted" event is an event indicating the completion of a job. This is one of events which are transmitted when a transmission request for information about a job has been received from the server 1120. While, actually, an event indicating the start of a job is also transmitted, the description thereof is omitted here.

An information column "device ID" 402 represents an identifier (ID) for uniquely identifying a device such as the MFP 1100.

An information column "occurrence time" 403 represents the time of occurrence of a phenomenon in the applicable event. In this case, the time of occurrence is almost the same as the time of completion of a job represented by the applicable event.

An information column "job ID" 404 represents an ID for uniquely identifying a job in the same device.

Usually, the job ID is a numerical value which is incremented by one for each execution of a job.

An information column "job type" 405 represents the type of a job, such as copy, print, and send.

An information column "print color mode" 406 represents with which of color and monochrome printing has been performed in the case of a job accompanied by printing (print job, print processing, or image forming processing).

An information column "number of printed sheets" 407 represents the number of actually printed sheets (the number of processing operations performed for print processing), which is incremented in the case of a job accompanied by printing.

An information column "scan color mode" 408 represents with which of color and monochrome scanning has been performed in the case of a job accompanied by scanning (scan job or reading processing).

An information column "number of scanned pages" 409 represents the number of actually scanned pages (the number of processing operations performed for read processing), which is incremented in the case of a job accompanied by scanning.

In this way, the information column 402 to the information column 409 enable knowing information such as the number of printed sheets and the number of scanned pages concerning each job. For example, in the event of No. 1, the notification event enables knowing the MFP 1100 has executed a copy job, has read an original of two pages in color, and has performed printing in color on ten sheets of paper. While such information added to each event includes, besides the information column 402 to the information column 409, various pieces of information about a job, the description thereof is omitted here.

Data about the notification event illustrated in FIG. 4A is communicated by the job control unit 205 to the event collection unit 209, is subjected to data shaping, and is then communicated to the server 1120 via the event transmission unit 211. In the server 1120, upon receiving this event, the data shaping unit 302 discriminates the event and then stores the event in the acquired data storage unit 303. Moreover, the data analysis unit 305 performs filtering of data stored in the acquired data storage unit 303 based on information in the information column "device ID" 402, and further performs filtering of only jobs in a specific time period based on information in the information column "occurrence time" 403. Adding the numbers of printed sheets and the numbers of scanned pages together in the data obtained by performing filtering enables obtaining the sum of numbers of printed sheets and numbers of scanned pages in the specific time period.

FIG. 4B illustrates examples of notification events which are periodically recorded concerning device information about the MFP 1100 and are then transmitted to the server 1120. Again, while an actual notification event is also data which is transmitted in a format such as JSON or XML, here, for ease of explanation, the content of data is expressed in tabular form. Moreover, each row represents one notification event.

An information column "event name" 411 represents the name of an event which is transmitted.

A "BasicInfoSnapshotted" event is an event which is periodically transmitted about basic information about each device. This is one of events which are transmitted when a transmission request for information concerning device information about devices has been received from the server 1120. While, actually, besides, an event indicating a change of the device information is also transmitted, the description thereof is omitted here.

An information column "device ID" 412 represents an ID for uniquely identifying a device such as the MFP 1100.

An information column "occurrence time" 413 represents the time of occurrence of a phenomenon in the applicable event. In this case, the time of occurrence is the time at which the device information was internally acquired, which occurs periodically.

An information column "printer type" 414 represents the type of a printer included in a device such as the MFP 1100, and indicates one of a color printer and a monochrome printer.

An information column "rated number of color printed sheets" 415 represents the rated number of color printed sheets which are able to be output per minute in a case where the printer is a color printer.

An information column "rated number of monochrome printed sheets" 416 represents the rated number of monochrome printed sheets which are able to be output per minute by the printer.

An information column "scanner type" 417 represents the type of a scanner in a case where the device includes the scanner, and indicates one of a color scanner and a monochrome scanner.

An information column "rated number of color scanned pages" 418 represents the rated number of color scanned pages which are able to be read per minute by a color scanner in a case where the device includes the color scanner.

An information column "rated number of monochrome scanned pages" 419 represents the rated number of monochrome scanned pages which are able to be read per minute by a scanner in a case where the device includes the scanner.

In this way, the information column 412 to the information column 419 of this event enable knowing information such as the rated number of printed sheets and the rated number of scanned pages concerning a device such as the MFP 1100. While such information added to each event includes, besides the information column 412 to the information column 419, various pieces of information about a device, the description thereof is omitted here.

With regard to data about notification events illustrated in FIG. 4B, one of the function applications 207 periodically acquires device information at a previously designated time interval and communicates the acquired device information to the event collection unit 209. The event collection unit 209 transmits this notification event to the server 1120 via the event transmission unit 211.

In the server 1120, upon receiving this event, the data shaping unit 302 discriminates the event and then stores the event in the device information storage unit 304. Moreover, the data analysis unit 305 performs filtering of data stored in the device information storage unit 304 based on information in the information column "device ID" 412, and then acquires the latest information based on information in the information column "occurrence time" 413, thus acquiring the latest information about the device.

<Processing Flow of MFP 1100>

Figure 5:
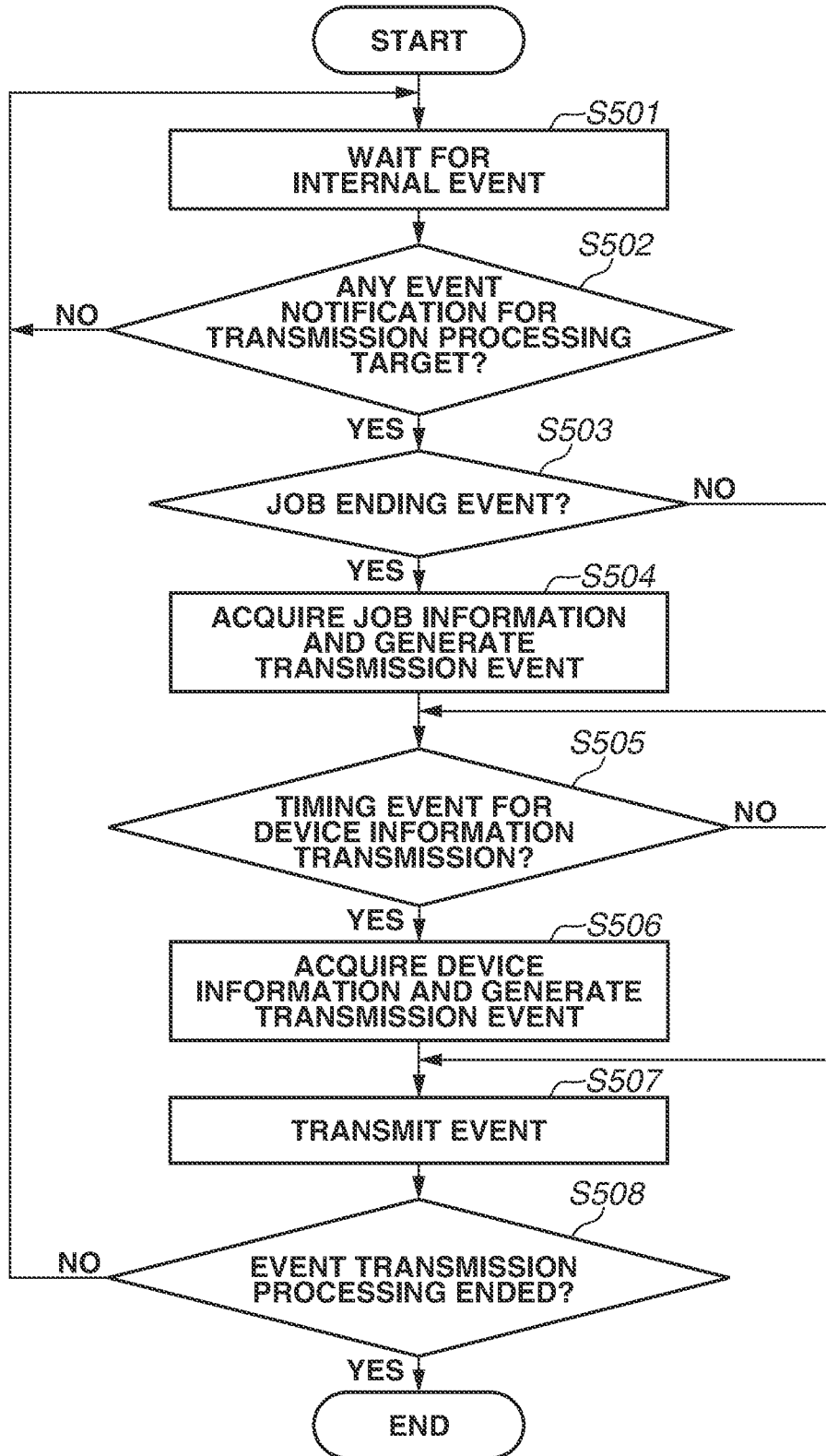
FIG. 5 is a flowchart illustrating event processing which the MFP performs according to one or more aspects of the present disclosure.

FIG. 5 is a flowchart illustrating event processing which the MFP 1100 performs in the first exemplary embodiment. Each step in the flowchart of FIG. 5 is processed by the CPU 101 executing a control program stored in the HDD 104. Thus, each processing is performed by the controller unit 100. Here, transmission processing for a notification event which the MFP 1100 performs is described in detail, and the reception of a notification event request from the server 1120 and the setting thereof are omitted from description.

First, in step S501, the event collection unit 209 waits for reception of an internal event from an internal function module.

Next, in step S502, the event collection unit 209 determines whether an internal event for a transmission processing target has been received from an internal function module. Specifically, the event collection unit 209 determines, based on information about a transmission target event stored in the notification setting holding unit 203, whether the received event is an internal event corresponding to the transmission target event. If it is determined that the internal event has not been received (NO in step S502), the event collection unit 209 returns the processing to step S501.

If, in step S502, it is determined that an internal event for a transmission processing target has been received from an internal function module (YES in step S502), then in step S503, the event collection unit 209 determines whether the received internal event is a job ending event. If it is determined that the received internal event is not a job ending event (NO in step S503), the controller unit 100 advances the processing to step S505.

If, in step S503, it is determined that the received internal event is a job ending event (YES in step S503), then in step S504, the controller unit 100 acquires information about a job and generates a transmission event. Specifically, the controller unit 100 acquires information equivalent to the information column of a JobCompleted event illustrated in FIG. 4A from, for example, an information column about a job added to the internal event or information stored in the history setting holding unit 208. Additionally, the controller unit 100 shapes the acquired information into a data format of the JobCompleted event, and stores the generated JobCompleted event as a file in the message buffer 210. Here, the event collection unit 209 previously stores a setting as to an ending event of what job type to generate as a transmission event. Alternatively, a method of receiving a designation of a job type from the server 1120, storing such information in the notification setting holding unit 203, and generating a transmission event of the designated job type based on such information can be employed.

Next, in step S505, the event collection unit 209 determines whether the received internal event is a timing event for device information transmission. If it is determined that the received internal event is not a timing event for device information transmission (NO in step S505), the controller unit 100 advances the processing to step S507.

If, in step S505, it is determined that the received internal event is a timing event for device information transmission (YES in step S505), then in step S506, the controller unit 100 acquires information about a device and generates a transmission event. Specifically, the controller unit 100 acquires information equivalent to the information column of a BasicInfoSnapshotted event illustrated in FIG. 4B from, for example, the function applications 207 or the history setting holding unit 208. Additionally, the controller unit 100 shapes the acquired information into a data format of the BasicInfoSnapshotted event, and stores the generated BasicInfoSnapshotted event as a file in the message buffer 210.

Next, in step S507, the event transmission unit 211 transmits the transmission event stored in the message buffer 210 to the server 1120 via the network communication unit 201.

After that, in step S508, the event collection unit 209 determines whether the event transmission processing itself to the server 1120 has ended. Specifically, the event collection unit 209 determines whether there is a transmission target event in the notification setting holding unit 203. In a case where there is no transmission target event in the notification setting holding unit 203, the event collection unit 209 determines that the event transmission processing itself has ended (YES in step S508), and then ends a series of processing. In a case where there is a transmission target event, the event collection unit 209 determines that the event transmission processing is still continuing (NO in step S508), and the controller unit 100 then returns the processing to step S501.

In this way, transmission events such as those illustrated in FIGS. 4A and 4B are communicated from the MFP 1100 to the server 1120.

<Processing Flow of Server 1120>

Figure 6:
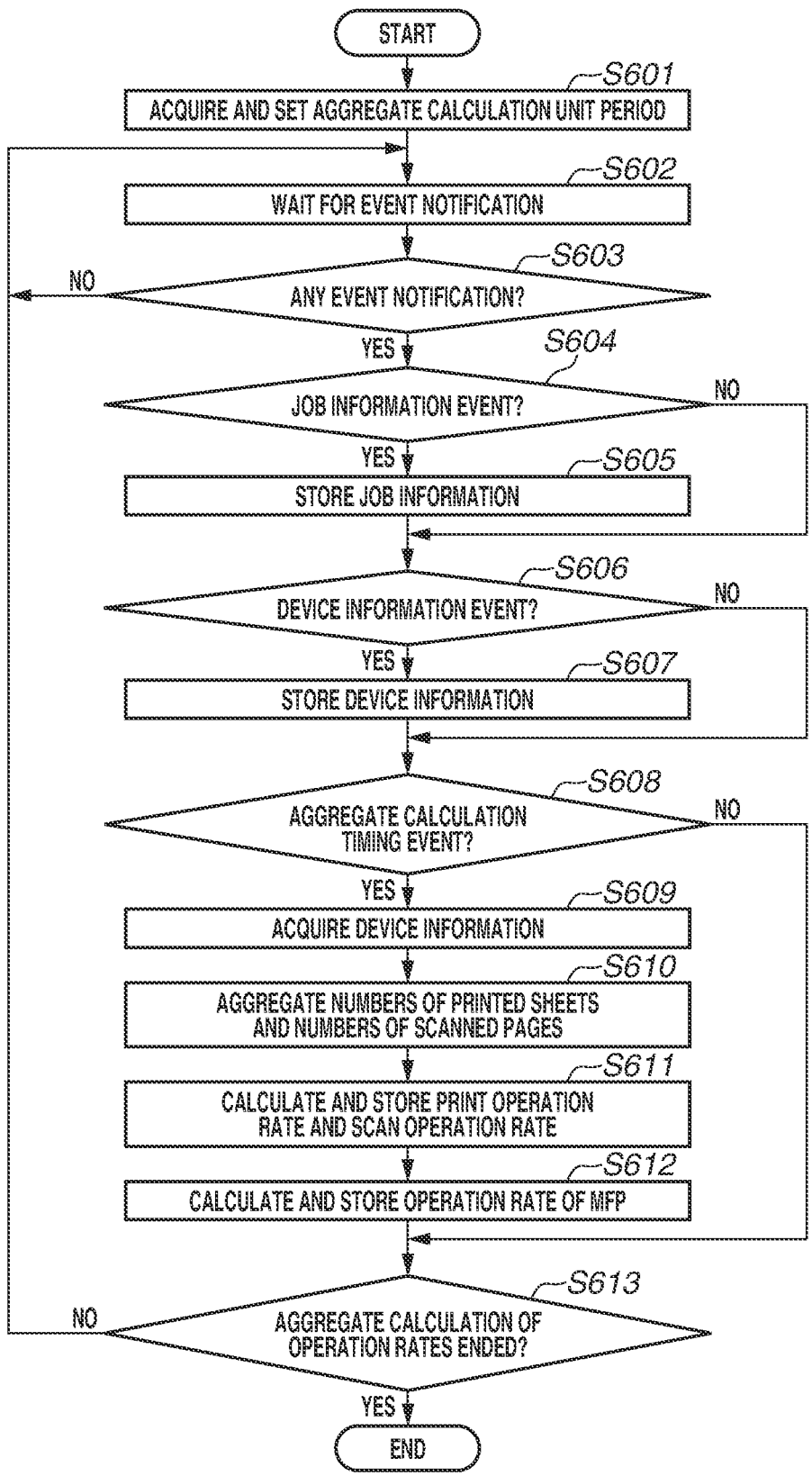
FIG. 6 is a flowchart illustrating processing which the server performs according to one or more aspects of the present disclosure.

FIG. 6 is a flowchart illustrating processing which the server 1120 performs in the first exemplary embodiment. Each step in the flowchart of FIG. 6 is processed by the CPU 121 executing a control program stored in the HDD 124. Thus, each processing is performed by the control unit 120. Here, reception of an event and analysis processing of data which the server 1120 performs are described in detail.

First, in step S601, the data analysis unit 305 instructs the aggregated information storage unit 309 to acquire data about intervals of data aggregate calculation and analysis and instructs the timer control unit 308 to communicate analysis timing at every such interval. Additionally, the notification data generation unit 310 generates, from analysis target data information stored in the aggregated information storage unit 309, an event notification request to the MFP 1100, and transmits the event notification request to the MFP 1100 via the network communication unit 301.

Next, in step S602, the data shaping unit 302 and the data analysis unit 305 wait for reception of a transmission event from the MFP 1100 and reception of an analysis timing event from the timer control unit 308.

Additionally, in step S603, the control unit 120 determines whether the transmission event from the MFP 1100 or the analysis timing event from the timer control unit 308 has been received. If it is determined that no event has been received (NO in step S603), the control unit 120 returns the processing to step S602.

If, in step S603, it is determined that an event has been received (YES in step S603), then in step S604, the data shaping unit 302 determines whether the received event is an event concerning job information transmitted from the MFP 1100. Specifically, the data shaping unit 302 determines whether the received event is a JobCompleted event based on information about the information column "event name" 401 illustrated in FIG. 4A and the information column "event name" 411 illustrated in FIG. 4B. If it is determined that the received event is not an event concerning job information (NO in step S604), the data shaping unit 302 advances the processing to step S606.

If, in step S604, it is determined that the received event is an event concerning job information (YES in step S604), then in step S605, the data shaping unit 302 shapes data about the event and then stores the shaped data in the acquired data storage unit 303.

Next, in step S606, the control unit 120 determines whether the received event is an event concerning device information transmitted from the MFP 1100. Specifically, the control unit 120 determines whether the received event is a BasicInfoSnapshotted event based on information about the information column "event name" 401 illustrated in FIG. 4A and the information column "event name" 411 illustrated in FIG. 4B. If it is determined that the received event is not an event concerning device information (NO in step S606), the control unit 120 advances the processing to step S608.

If, in step S606, it is determined that the received event is an event concerning device information (YES in step S606), then in step S607, the data shaping unit 302 shapes data about the event and then stores the shaped data in the device information storage unit 304.

Additionally, in step S608, the control unit 120 determines whether the received event is an analysis timing event transmitted from the timer control unit 308. If it is determined that the received event is not an analysis timing event (NO in step S608), the control unit 120 advances the processing to step S613. If, in step S608, it is determined that the received event is an analysis timing event (YES in step S608), the data analysis unit 305 specifies an MFP 1100 targeted for analysis.

Additionally, in step S609, the control unit 120 acquires, from the device information storage unit 304, information including the rated number of printed sheets and the rated number of scanned pages of the MFP 1100 targeted for analysis based on the device ID of the MFP 1100 targeted for analysis.

Moreover, the data analysis unit 305 acquires, from the acquired data storage unit 303, information including the number of printed sheets and the number of printed pages based on the device ID of the MFP 1100 targeted for analysis. Additionally, in step S610, the control unit 120 obtains the total number of printed sheets and the total number of scanned pages of the analysis target device in a specific time period. These total numbers are able to be obtained by adding together values in the information column "number of printed sheets" 407 and adding together values in the information column "number of scanned pages" 409 based on information in the information column "device ID" 402 and the information column "occurrence time" 403 illustrated in FIG. 4A, as mentioned above.

After that, in step S611, the data analysis unit 305 calculates a print operation rate and a scan operation rate of the analysis target device. To perform these calculations, the rated number of printed sheets and the rated number of scanned pages of the device acquired in step S609 and the total number of printed sheets and the total number of scanned pages in a specific time period acquired in step S610 are used. The print operation rate is a rate representing to what extent the printer has operated in a specific time period and is obtained in the following way:

$$\text{Print operation rate} = (\text{Total number of printed sheets in specific time period})/(\text{Rated number of printed sheets per minute} \times \text{Fraction in specific time period}).$$

If the specific time period (unit time period) is assumed to be one month, the print operation rate is expressed as follows:

Print operation rate=(Total number of printed sheets in one month)/(Rated number of printed sheets per minute×60 minutes×24 hours×Number of days of one month), and becomes almost the same as the operation rate in the Ministry of the Environment's guideline mentioned above as follows:

Operation rate=(Monthly number of output sheets)/ (Number of output sheets per minute×60 minutes×7 hours×20 days).

Here, since the fraction in the specific time period becomes the same value with respect to any device, with regard to the purpose of making a comparison between devices, there is no problem even if 24 hours is assumed to be 7 hours, which is office's average working hours, and the number of days of one month is assumed to be 20 days. Therefore, the print operation rate is considered to represent the same as the operation rate in the Ministry of the Environment's guideline.

Moreover, in a case where the rated number of printed sheets (the number of processable sheets) per minute differs between color print and monochrome print, the print operation rate is obtained as follows:

Print operation rate=(Number of color printed sheets in specific time period)/(Rated number of color printed sheets per minute×Fraction in specific time period)+(Number of monochrome printed sheets in specific time period)/(Rated number of monochrome printed sheets per minute×Fraction in specific time period).

This print operation rate is able to be obtained based on data illustrated in FIGS. 4A and 4B.

Additionally, the operation status of a device equipped with a scanner, such as the MFP 1100, is not able to be correctly recognized only by the print operation rate. Accordingly, a rate representing to what extent the scanner has operated in a specific time period is obtained as a scan operation rate in the following way:

Scan operation rate=(Total number of scanned pages in specific time period)/(Rated number of scanned pages per minute×Fraction in specific time period).

If the specific time period is assumed to be one month, the scan operation rate is expressed as follows:

Scan operation rate=(Total number of scanned pages in one month)/(Rated number of scanned pages per minute×60 minutes×24 hours×Number of days of one month).

Moreover, in a case where the rated number of scanned pages differs between color scan and monochrome scan, the scan operation rate is obtained as follows:

Scan operation rate=(Number of color scanned pages in specific time period)/(Rated number of color scanned pages per minute×Fraction in specific time period)+(Number of monochrome scanned pages in specific time period)/(Rated number of monochrome scanned pages per minute×Fraction in specific time period).

After that, the data analysis unit 305 stores the print operation rate and the scan operation rate obtained in this way as well as an ID for identifying the analyzed device in the analysis data storage unit 306.

Additionally, in step S612, the data analysis unit 305 calculates the operation rate of the MFP 1100 based on the print operation rate and the scan operation rate obtained in step S611. The operation rate of the MFP 1100 is an operation rate of the overall MFP 1100 calculated in consideration of operations of both the printer and scanner, and is obtained as follows:

Operation rate of MFP 1100=(Print operation rate+ Scan operation rate)/2.

This enables making a comparison between respective MFPs 1100 concerning to what extent the overall MFP 1100 is operating.

Additionally, the data analysis unit 305 obtains a print utilization rate and a scan utilization rate (operation ratio information), which represent at what rates (ratios) the MFP 1100 has utilized print and scan while being operating. The print utilization rate and the scan utilization rate are obtained in the following way:

Print utilization rate=(Print operation rate)/(Print operation rate+Scan operation rate), and Scan utilization rate=(Scan operation rate)/(Print operation rate+Scan operation rate).

The data analysis unit 305 stores the operation rate of the MFP 1100, the print utilization rate, and the scan utilization rate as well as an ID for identifying the analyzed device in the analysis data storage unit 306.

After that, in step S613, the data analysis unit 305 determines whether the aggregate calculation processing for operation rates itself has ended. Specifically, the data analysis unit 305 determines whether data for data aggregate calculation and data for analysis intervals in the aggregated information storage unit 309 are in an ineffective state. If it is determined that the aggregate calculation processing itself has ended (YES in step S613), the control unit 120 ends a series of processing. If it is determined that the aggregate calculation processing itself has not yet ended (NO in step S613), the control unit 120 returns the processing to step S602.

<Operation Rates>

FIG. 7 illustrates an example of operation rate information which the server 1120 displays. This is a display example in which the operation rates obtained by a series of processing illustrated in FIG. 6 are displayed on the operation display unit 128 of the server 1120. Instead of displaying performed by the server 1120, operation rate data stored in the analysis data storage unit 306 can be transmitted to an external information processing apparatus and be displayed there. Here, displaying of the operation rates is performed in tabular form. The operation rates and utilization rates of each MFP 1100 are displayed in each row.

An information column "device ID" 701 represents an ID for uniquely identifying a device.

An information column 702 to an information column 706 represent, as indicated by the respective titles in the table, the print operation rate, the scan operation rate, the operation rate of the MFP 1100, the print utilization rate, and the scan utilization rate. Conventional operation rates are almost the same values as those in the information column "print operation rate" 702 illustrated in FIG. 7. In this example, the MFP 1100 of No. 2 is the highest in operation rate and the MFP 1100 of No. 3 is the lowest in operation rate. However, from the viewpoint of the information column "scan operation rate" 703, the MFP 1100 of No. 3 is the highest in operation rate and the MFP 1100 of No. 2 is the lowest in operation rate. Then, comparing values in the information column "MFP operation rate" 704, which represents the operation rate of the overall MFP 1100, reveals that the MFP 1100 of No. 3 is the highest in operation rate and the MFP 1100 of No. 1 is the lowest in operation rate.

<Remarks>

In the above-described way, it is possible to recognize the operation rate of the overall MFP 1100 obtained in consideration of both print and scan, which is conventionally not able to be found by the operation rate obtained in consideration of only print, and, thus, it is possible to compare operation rates of the respective MFPs 1100. This enables comparing the respective MFPs 1100 by higher-accuracy operation rates consistent with actual usages of the respective MFPs 1100, and thus enables providing a more excellent service when providing services such as management and replacement of devices.

The above-described first exemplary embodiment is configured to obtain the operation rate of the MFP 1100 in consideration of an operation of the printer and an operation of the scanner. A second exemplary embodiment is configured to obtain the operation rate of the whole MFP 1100 in consideration of not only execution operations for printing and scanning in the MFP 1100 but also an execution of a job in which the printer and the scanner do not operate. The configuration of an information processing system according to the second exemplary embodiment is similar to that in the first exemplary embodiment except for components related to the above-mentioned characteristic portions. Therefore, similar components are assigned the respective same reference characters, and the detailed description thereof is omitted.

<Notification Events>

FIG. 8 is a diagram illustrating examples of notification events each of which is transmitted from MFP 1100 to the server 1120 in the second exemplary embodiment. While, as with FIGS. 4A and 4B, an actual notification event is data which is transmitted in a format such as JSON or XML, here, for ease of explanation, the content of data is expressed in tabular form. Moreover, likewise, each row represents one notification event.

An information column "event name" 801 to an information column "number of scanned pages" 809 are similar to the information column "event name" 401 to the information column "number of scanned pages" 409 illustrated in FIG. 4A. However, in the information column "job type" 805, jobs which are not accompanied by printing or scanning in execution thereof are added.

A job type "FaxTrans" represents FAX transmission having been performed, a job type "ReceivBox" represents a box storage having been performed, and a job type "BoxSend" represents a box document transmission having been performed. Moreover, a job type "ScanSend" represents a function of transmitting a scanned document to another information processing apparatus via a network, and is made distinguishable from the box document transmission.

A job which is not accompanied by printing or scanning and which processes electronic image data, such as the FAX transmission, box storage, and box document transmission, is referred to as a "paper non-use job (predetermined image processing)" for explanatory convenience. Moreover, the rate at which the paper non-use job has been executed in the MFP 1100 within a specific time period is referred to as a "paper non-use operation rate".

An information column "processing execution time" 810 represents a processing execution time taken for actual processing in each job. In the case of a paper non-use job type, a processing execution time taken therefor is added to the information column "processing execution time" 810.

An additional method of adding a job start event and obtaining a processing execution time from a difference between the job start event and a job end event can also be employed. However, here, a processing execution time calculated by each function application, which is higher in accuracy than that calculated by the additional method, is acquired from each function application or an execution history and is then added to information about a job end event.

Event transmission processing which the MFP 1100 in the second exemplary embodiment performs is almost the same as the processing illustrated in FIG. 5, which the MFP 1100 in the first exemplary embodiment performs. However, in step S504 illustrated in FIG. 5, a paper non-use job is added to the type of a job which processes a job end event. In the case of a paper non-use job, information about a processing execution time is acquired from the associated function application 207 or the history setting holding unit 208 and is then added to a transmission event.

<Processing Flow of Server 1120>

FIG. 9 is a flowchart of processing which the server 1120 in the second exemplary embodiment performs. Each step in the flowchart of FIG. 9 is processed by the CPU 121 executing a control program stored in the HDD 124. Thus, each processing is performed by the control unit 120.

Processing in step S901 to step S911 in FIG. 9 is the same as execution processing illustrated in FIG. 6, which the server 1120 in the first exemplary embodiment performs, and, therefore, the description thereof is omitted here.

After calculating the print operation rate and the scan operation rate of the MFP 1100 targeted for analysis in step S911, then in step S912, the data analysis unit 305 obtains the sum of processing times of paper non-use jobs. Here, the data analysis unit 305 extracts information about the information column "processing execution time" 810 for paper non-use jobs illustrated in FIG. 8 from the acquired data storage unit 303 based on the device ID of the MFP 1100 targeted for analysis. Then, the data analysis unit 305 obtains the sum of processing execution times (a total processing time) of the analysis target device in a specific time period.

After that, in step S913, the data analysis unit 305 obtains a paper non-use operation rate from the sum of processing times of paper non-use jobs obtained in step S912. The data analysis unit 305 obtains the paper non-use operation rate in the following way:

Paper non-use operation rate=(Sum of paper non-use job processing times in specific time period)/ (Hours in specific time period).

The data analysis unit 305 stores the obtained paper non-use operation rate, together with the ID for identifying the analysis target device, in the analysis data storage unit 306.

Additionally, in step S914, the data analysis unit 305 obtains an operation rate of the MFP 1100, with processing for paper non-use jobs taken into consideration, from the print operation rate and scan operation rate obtained in step S911 and the paper non-use operation rate obtained in step S913. Here, the data analysis unit 305 obtains the operation rate of the MFP 1100 with printing, scanning, and paper non-use jobs taken into consideration in the following way:

Operation rate of MFP 1100=(Print operation rate+ Scan operation rate+Paper non-use operation rate)/3.

Moreover, in addition to a print utilization rate and a scan utilization rate, the data analysis unit 305 obtains a paper non-use utilization rate, which is the rate at which paper non-use jobs are utilized. The data analysis unit 305 obtains the print utilization rate, the scan utilization rate, and the paper non-use utilization rate in the following way:

Print utilization rate=(Print operation rate)/(Print operation rate+Scan operation rate+Paper non-use operation rate), Scan utilization rate=(Scan operation rate)/(Print operation rate+Scan operation rate+Paper non-use operation rate), and Paper non-use utilization rate=(Paper non-use operation rate)/(Print operation rate+Scan operation rate+Paper non-use operation rate).

The data analysis unit 305 stores, in the analysis data storage unit 306, the operation rate of the MFP 1100, the print utilization rate, the scan utilization rate, and the paper non-use utilization rate together with the ID for identifying the analysis target device.

After that, the data analysis unit 305 performs processing in step S915 and subsequent steps, which is the same as processing in step S613 and subsequent steps illustrated in FIG. 6 and is, therefore, omitted from description.

<Operation Rates>

FIG. 10 illustrate examples of operation rates which the server 1120 in the second exemplary embodiment displays.

This is a display example in which the operation rates obtained by a series of processing illustrated in FIG. 9 are displayed on the operation display unit 128 of the server 1120. Here, displaying of the operation rates is performed in tabular form as with the example illustrated in FIG. 7.

In addition to the operation rates illustrated as an example in FIG. 7, an information column "paper non-use operation rate" 1004 and an information column "paper non-use utilization rate" 1008 are additionally displayed. Moreover, an information column "MFP operation rate" 1005, which represents the operation rate of the MFP 1100, takes a value with the paper non-use operation rate taken into consideration. In this example, it is found that the MFP 1100 of No. 2 is the highest in print operation rate and the MFP 1100 of No. 3 is the lowest in scan operation rate. However, it is found that the MFP 1100 of No. 1 is the highest in paper non-use operation rate. Accordingly, it is presumed that the MFP 1100 of No. 1 is a device which is less used for printing and scanning but has a high role as a reception server such as a FAX reception and transfer server.

<Remarks>

As described above, the second exemplary embodiment enables, even in an MFP 1100 in which processing not using a printer or a scanner is performed, correctly reflecting an actual usage thereof in the operation rate of the MFP 1100. Accordingly, even in a case where there is an MFP 1100 in which processing not using a printer or a scanner is performed in, for example, an office, it is possible to compare respective MFPs 1100 based on high-accuracy operation rates associated with actual usages of the respective MFPs 1100. As a result, it is possible to increase the convenience of management or replacement of devices.

<Notification Events>

FIGS. 11A, 11B, and 11C are diagrams schematically illustrating examples of notification events each of which is transmitted from MFP 1100 to the server 1120 in a third exemplary embodiment. Here, two types of notification events in the third exemplary embodiment among the notification events which are transmitted from the MFP 1100 to the server 1120 are described with reference to FIGS. 11A to 11C.

FIG. 11A illustrates examples of notification events which are recorded when various types of jobs have been completed in the MFP 1100 and are transmitted to the server 1120. While an actual notification event is data which is transmitted in a format such as JSON or XML, here, for ease of explanation, the content of data is expressed in tabular form. Each row represents one notification event.

An information column "event name" 10401 represents the name of an event which is transmitted. A "JobCompleted" event is an event indicating the completion of a job. This is one of events which are transmitted when a transmission request for information about a job has been received from the server 1120. While, actually, an event indicating the start of a job is also transmitted, the description thereof is omitted here.

An information column "device ID" 10402 represents an ID for uniquely identifying a device such as the MFP 1100.

An information column "occurrence time" 10403 represents the time of occurrence of a phenomenon in the applicable event. In this case, the time of occurrence is almost the same as the time of completion of a job represented by the applicable event.

An information column "job ID" 10404 represents an ID for uniquely identifying a job in the same device.

Usually, the job ID is a numerical value which is incremented by one for each execution of a job.

An information column "job type" 10405 represents the type of a job, such as copy, print, and send.

An information column "print color mode" 10406 represents with which of color and monochrome printing has been performed in the case of a job accompanied by printing.

An information column "number of printed pages" 10407 represents the number of actually printed sheets (the number of processing operations), which is incremented in the case of a job accompanied by printing.

An information column "scan color mode" 10408 represents with which of color and monochrome scanning has been performed in the case of a job accompanied by scanning.

An information column "number of scanned pages" 10409 represents the number of actually scanned pages, which is incremented in the case of a job accompanied by scanning.

In this way, the information column 10402 to the information column 10409 enable knowing information such as the number of printed pages and the number of scanned pages concerning each job. For example, in the event of No. 1, the notification event enables knowing the MFP 1100 has executed a copy job, has read an original of two pages in color, and has performed printing in color on ten sheets of paper. While such information added to each event includes, besides the information column 10402 to the information column 10409, various pieces of information about a job, the description thereof is omitted here.

Data about the notification event illustrated in FIG. 11A is communicated by the job control unit 205 to the event collection unit 209, is subjected to data shaping, and is then communicated to the server 1120 via the event transmission unit 211. In the server 1120, upon receiving this event, the data shaping unit 302 discriminates the event and then stores the event in the acquired data storage unit 303. Moreover, the data analysis unit 305 performs filtering of data stored in the acquired data storage unit 303 based on information in the information column "device ID" 10402, and further performs filtering of only jobs in a specific time period based on information in the information column "occurrence time"

10403. Adding the numbers of printed pages and the numbers of scanned pages together in the data obtained by performing filtering enables obtaining the sum of numbers of printed pages and numbers of scanned pages in the specific time period.

FIG. 11B illustrates examples of notification events which are periodically recorded concerning device information about the MFP 1100 and are then transmitted to the server 1120. Again, while an actual notification event is also data which is transmitted in a format such as JSON or XML, here, for ease of explanation, the content of data is expressed in tabular form. Moreover, each row represents one notification event. An information column "event name" 10411 represents the name of an event which is transmitted.

A "BasicInfoSnapshotted" event is an event which is periodically transmitted about basic information about each device. This is one of events which are transmitted when a transmission request for information concerning device information about devices has been received from the server 1120. While, actually, besides, an event indicating a change of the device information is also transmitted, the description thereof is omitted here.

An information column "device ID" 10412 represents an ID for uniquely identifying a device such as the MFP 1100. An information column "occurrence time" 10413 represents the time of occurrence of a phenomenon in the applicable event. In this case, the time of occurrence is the time at which the device information was internally acquired, which occurs periodically.

An information column "printer type" 10414 represents the type of a printer included in a device such as the MFP 1100, and indicates one of a color printer and a monochrome printer. An information column "rated number of color printed pages" 10415 represents the rated number of color printed pages which are able to be output per minute in a case where the printer is a color printer. An information column "rated number of monochrome printed pages" 10416 represents the rated number of monochrome printed pages which are able to be output per minute by the printer. An information column "scanner type" 10417 represents the type of a scanner in a case where the device includes the scanner, and indicates one of a color scanner and a monochrome scanner.

An information column "rated number of color scanned pages" 10418 represents the rated number of color scanned pages which are able to be read per minute by a color scanner in a case where the device includes the color scanner. An information column "rated number of monochrome scanned pages" 10419 represents the rated number of monochrome scanned pages which are able to be read per minute by a scanner in a case where the device includes the scanner. In this way, the information column 10412 to the information column 10419 of this event enable knowing information such as the rated number of printed pages and the rated number of scanned pages concerning a device such as the MFP 1100. While such information added to each event includes, besides the information column 10412 to the information column 10419, various pieces of information about a device, the description thereof is omitted here.

With regard to data about notification events illustrated in FIG. 11B, one of the function applications 207 periodically acquires device information at a previously designated time interval and communicates the acquired device information to the event collection unit 209. The event collection unit 209 transmits this notification event to the server 1120 via the event transmission unit 211. In the server 1120, upon receiving this event, the data shaping unit 302 discriminates the event and then stores the event in the device information storage unit 304. Moreover, the data analysis unit 305 performs filtering of data stored in the device information storage unit 304 based on information in the information column "device ID" 10412. Then, the data analysis unit 305 acquires the latest information based on information in the information column "occurrence time" 10413, thus acquiring the latest information about the device.

FIG. 11C illustrates examples of notification events which are recorded at the time of a change in state of the device such as the MFP 1100 and are transmitted to the server 1120. Again, while an actual notification event is data which is transmitted in a format such as JSON or XML, here, for ease of explanation, the content of data is expressed in tabular form. Moreover, each row represents one notification event. An information column "event name" 10421 represents the name of an event which is transmitted. A "StatusChanged" event is an event indicating a change in state of the device. This is one of events which are transmitted when a transmission request for information about a change in state of the device has been received from the server 1120. While, actually, an event indicating a change in state of the device is also transmitted, the description thereof is omitted here. An information column "device ID" 10422 represents an ID for uniquely identifying a device such as the MFP 1100. An information column "occurrence time" 10423 represents the time of occurrence of a phenomenon in the applicable event. An information column "status" 10424 represents a state indicating whether the MFP 1100 is currently able to operate. "Standby" indicates a printing enabled state, "Malfunction" indicates a malfunction, "PrinterJam" indicates a jam in the printer, and "NoToner" indicates no toner in the printer, thus indicating a printing disabled state.

Data about the notification event illustrated in FIG. 11C is communicated by the history setting holding unit 208 to the event collection unit 209, is subjected to data shaping, and is then communicated to the server 1120 via the event transmission unit 211. In the server 1120, upon receiving this event, the data shaping unit 302 discriminates the event and then stores the event in the acquired data storage unit 303. Moreover, the data analysis unit 305 performs filtering of data stored in the acquired data storage unit 303 based on information in the information column "device ID" 10422, and further performs filtering of only jobs in a specific time period based on information in the information column "occurrence time" 10423. In this way, it is possible to calculate a cumulative time in a printing enabled state within the specific time period from the filtered data.

<Processing Flow of MFP 1100>

Figure 12:
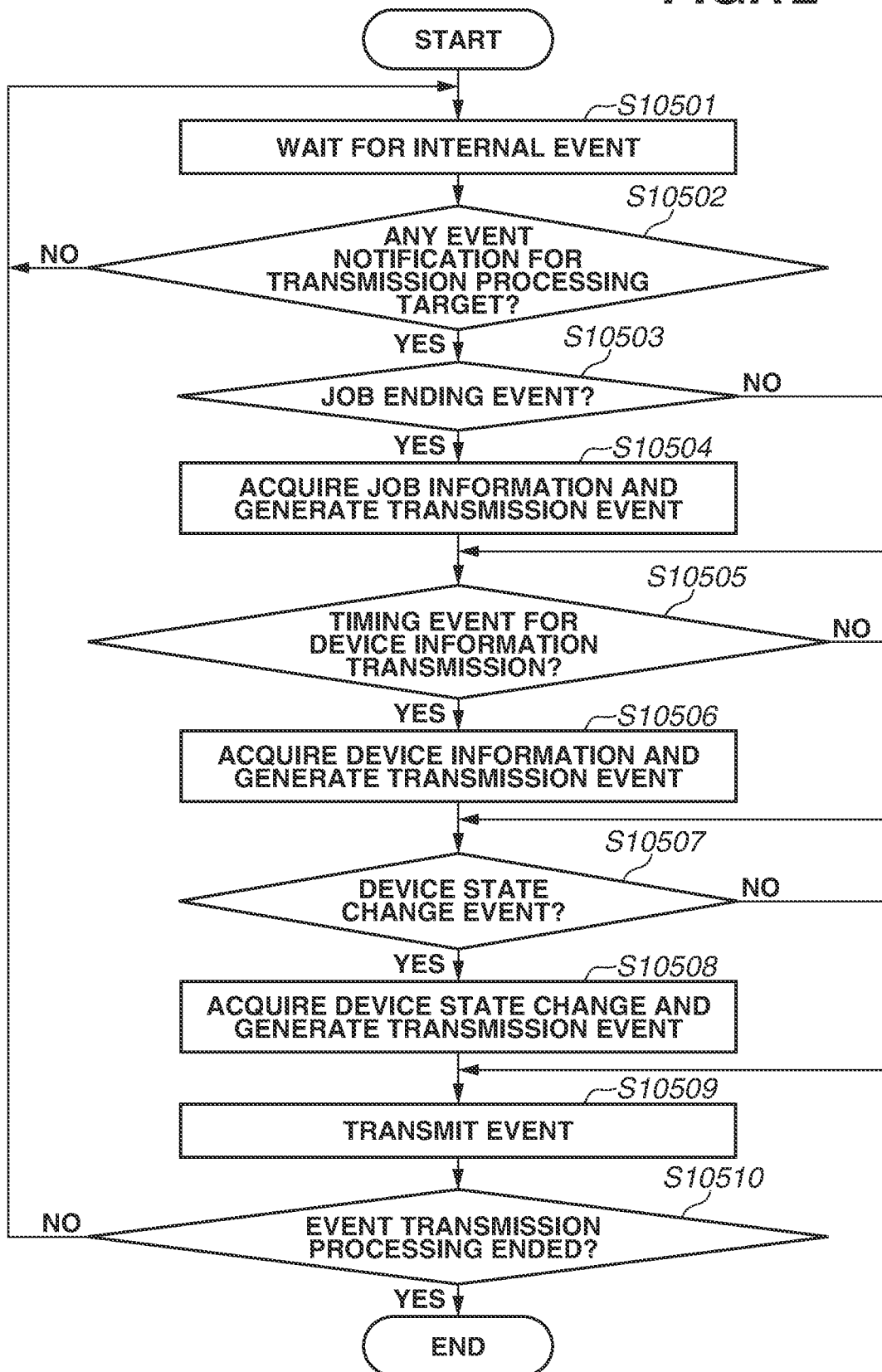
FIG. 12 is a flowchart illustrating event processing which the MFP performs according to one or more aspects of the present disclosure.

FIG. 12 is a flowchart illustrating event processing which the MFP 1100 performs in the third exemplary embodiment.

Each step in the flowchart of FIG. 12 is processed by the CPU 101 executing a control program stored in the HDD 104. Thus, each processing is performed by the controller unit 100. Here, transmission processing for a notification event which the MFP 1100 performs is described in detail, and the reception of a notification event request from the server 1120 and the setting thereof are omitted from description.

First, in step S10501, the event collection unit 209 waits for reception of an internal event from an internal function module.

Next, in step S10502, the event collection unit 209 determines whether an internal event for a transmission processing target has been received from an internal function module. Specifically, the event collection unit 209 determines, based on information about a transmission target event stored in the notification setting holding unit 203, whether the received event is an internal event corresponding to the transmission target event. If it is determined that the internal event has not been received (NO in step S10502), the controller unit 100 returns the processing to step S10501.

If, in step S10502, it is determined that an internal event for a transmission processing target has been received from an internal function module (YES in step S10502), then in step S10503, the event collection unit 209 determines whether the received internal event is a job ending event. If it is determined that the received internal event is not a job ending event (NO in step S10503), the controller unit 100 advances the processing to step S10505.

If, in step S10503, it is determined that the received internal event is a job ending event (YES in step S10503), then in step S10504, the controller unit 100 acquires information about a job and generates a transmission event. Specifically, the controller unit 100 acquires information equivalent to the information column of a JobCompleted event illustrated in FIG. 11A from, for example, an information column about a job added to the internal event or information stored in the history setting holding unit 208. Additionally, the controller unit 100 shapes the acquired information into a data format of the JobCompleted event, and stores the generated JobCompleted event as a file in the message buffer 210. Here, the event collection unit 209 previously stores a setting as to an ending event of what job type to generate as a transmission event. Alternatively, a method of receiving a designation of a job type from the server 1120, storing such information in the notification setting holding unit 203, and generating a transmission event of the designated job type based on such information can be employed.

Next, in step S10505, the event collection unit 209 determines whether the received internal event is a timing event for device information transmission. If it is determined that the received internal event is not a timing event for device information transmission (NO in step S10505), the controller unit 100 advances the processing to step S10507.

If, in step S10505, it is determined that the received internal event is a timing event for device information transmission (YES in step S10505), then in step S10506, the controller unit 100 acquires information about a device and a generates a transmission event. Specifically, the controller unit 100 acquires information equivalent to the information column of a BasicInfoSnapshotted event illustrated in FIG. 11B from, for example, the function applications 207 or the history setting holding unit 208. Additionally, the controller unit 100 shapes the acquired information into a data format of the BasicInfoSnapshotted event, and stores the generated BasicInfoSnapshotted event as a file in the message buffer 210.

If, in step S10507, it is determined that the received internal event is an event for device state change (YES in step S10507), then in step S10508, the controller unit 100 acquires information about a device state change and generates a transmission event. Specifically, the controller unit 100 acquires information equivalent to the information column of a StatusChanged event illustrated in FIG. 11C from, for example, an information column related to a device state change added to the internal event or information stored in the history setting holding unit 208. Additionally, the controller unit 100 shapes the acquired information into a data format of the StatusChanged event, and stores the generated StatusChanged event as a file in the message buffer 210. Here, the event collection unit 209 previously stores a setting as to an event of what state change to generate as a transmission event. Alternatively, a method of receiving a designation of a state change event from the server 1120, storing such information in the notification setting holding unit 203, and generating a transmission event of the designated device state change based on such information can be employed.

Next, in step S10509, the event transmission unit 211 transmits the transmission event stored in the message buffer 210 to the server 1120 via the network communication unit 201.

After that, in step S10510, the event collection unit 209 determines whether the event transmission processing itself to the server 1120 has ended. Specifically, the event collection unit 209 determines whether there is a transmission target event in the notification setting holding unit 203. In a case where there is no transmission target event in the notification setting holding unit 203, the event collection unit 209 determines that the event transmission processing itself has ended (YES in step S10510), and then ends a series of processing. In a case where there is a transmission target event, the event collection unit 209 determines that the event transmission processing is still continuing (NO in step S10510), and the controller unit 100 then returns the processing to step S10501.

In this way, transmission events such as those illustrated in FIGS. 11A, 11B, and 11C are communicated from the MFP 1100 to the server 1120.

<Processing Flow of Server 1120>

Figure 13:
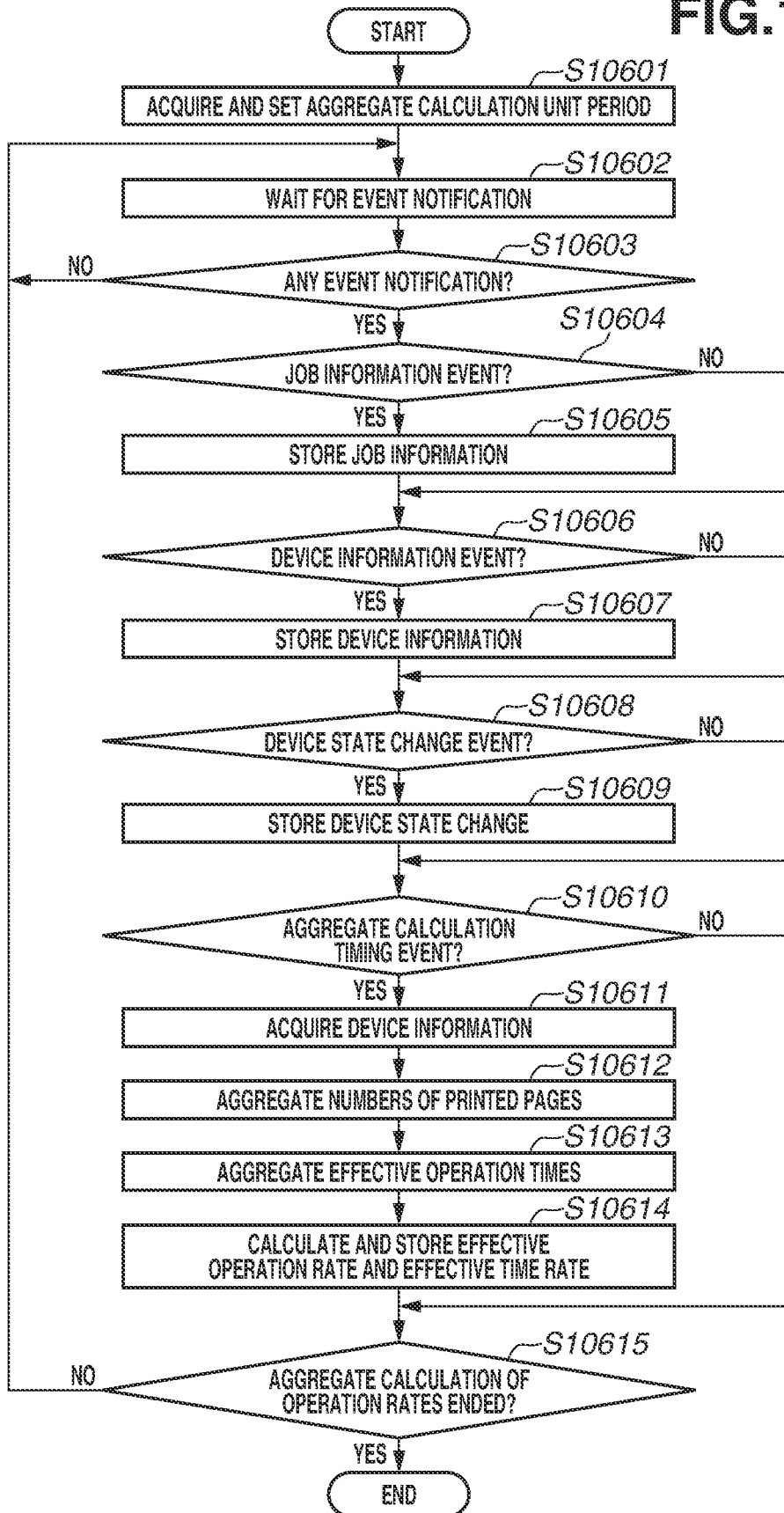
FIG. 13 is a flowchart illustrating processing which the server performs according to one or more aspects of the present disclosure.

FIG. 13 is a flowchart illustrating processing which the server 1120 performs in the third exemplary embodiment. Each step in the flowchart of FIG. 13 is processed by the CPU 121 executing a control program stored in the HDD 124. Thus, each processing is performed by the control unit 120. Here, reception of an event and analysis processing of data which the server 1120 performs are described in detail.

First, in step S10601, the data analysis unit 305 instructs the aggregated information storage unit 309 to acquire data about intervals of data aggregate calculation and analysis and instructs the timer control unit 308 to communicate analysis timing at every such interval. Additionally, the notification data generation unit 310 generates, from analysis target data information stored in the aggregated information storage unit 309, an event notification request to the MFP 1100, and transmits the event notification request to the MFP 1100 via the network communication unit 301.

Next, in step S10602, the data shaping unit 302 and the data analysis unit 305 wait for reception of a transmission event from the MFP 1100 and reception of an analysis timing event from the timer control unit 308.

Additionally, in step S10603, the control unit 120 determines whether the transmission event from the MFP 1100 or the analysis timing event from the timer control unit 308 has been received. If it is determined that no event has been received (NO in step S10603), the control unit 120 returns the processing to step S10602.

If, in step S10603, it is determined that an event has been received (YES in step S10603), then in step S10604, the data shaping unit 302 determines whether the received event is an event concerning job information transmitted from the MFP 1100. Specifically, the data shaping unit 302 determines whether the received event is a JobCompleted event based on information about the information column "event name" 10401 illustrated in FIG. 11A, the information column "event name" 10411 illustrated in FIG. 11B, and the information column "event name" 10421 illustrated in FIG. 11C. If it is determined that the received event is not an event concerning job information (NO in step S10604), the control unit 120 advances the processing to step S10606.

If, in step S10604, it is determined that the received event is an event concerning job information (YES in step S10604), then in step S10605, the data shaping unit 302 shapes data about the event and then stores the shaped data in the acquired data storage unit 303.

Next, in step S10606, the control unit 120 determines whether the received event is an event concerning device information transmitted from the MFP 1100. Specifically, the control unit 120 determines whether the received event is a BasicInfoSnapshotted event based on information about the information column "event name" 10401 illustrated in FIG. 11A, the information column "event name" 10411 illustrated in FIG. 11B, and the information column "event name" 10421 illustrated in FIG. 11C. If it is determined that the received event is not an event concerning device information (NO in step S10606), the control unit 120 advances the processing to step S10608.

If, in step S10606, it is determined that the received event is an event concerning device information (YES in step S10606), then in step S10607, the data shaping unit 302 shapes data about the event and then stores the shaped data in the device information storage unit 304.

Next, in step S10608, the control unit 120 determines whether the received event is an event concerning a device state change transmitted from the MFP 1100. Specifically, the control unit 120 determines whether the received event is a StatusChanged event based on information about the information column "event name" 10401 illustrated in FIG. 11A, the information column "event name" 10411 illustrated in FIG. 11B, and the information column "event name" 10421 illustrated in FIG. 11C. If it is determined that the received event is not an event concerning a device state change (NO in step S10608), the control unit 120 advances the processing to step S10610.

If, in step S10608, it is determined that the received event is an event concerning a device state change (YES in step S10608), then in step S10609, the data shaping unit 302 shapes data about the event and then stores the shaped data in the device information storage unit 304.

Additionally, in step S10610, the control unit 120 determines whether the received event is an analysis timing event transmitted from the timer control unit 308. If it is determined that the received event is not an analysis timing event (NO in step S10610), the control unit 120 advances the processing to step S10615. If, in step S10610, it is determined that the received event is an analysis timing event (YES in step S10610), the data analysis unit 305 specifies an MFP 1100 targeted for analysis.

Additionally, in step S10611, the control unit 120 acquires, from the device information storage unit 304, information about the rated number of printed pages of the MFP 1100 targeted for analysis based on the device ID of the MFP 1100 targeted for analysis.

Moreover, the data analysis unit 305 acquires, from the acquired data storage unit 303, information about the number of printed pages based on the device ID of the MFP 1100 targeted for analysis. Additionally, in step S10612, the control unit 120 obtains the total number of printed pages of the analysis target device in a specific time period. This total number is able to be obtained by adding together values in the information column "number of printed pages" 10407 based on information in the information column "device ID" 10402 and the information column "occurrence time" 10403 illustrated in FIG. 11A, as mentioned above.

In step S10613, the data analysis unit 305 aggregates effective operation times (effective time period information) of the analysis target device.

The data analysis unit 305 acquires a state change of the device from the acquired data storage unit 303 based on the device ID of the MFP 1100 targeted for analysis. Additionally, in step S10613, the control unit 120 obtains a cumulative time in which the MFP 1100 targeted for analysis is able to execute a job in a specific time period. Specifically, the control unit 120 obtains the cumulative time by adding together time periods in which the MFP 1100 was able to operate (time periods for Standby) based on a status history such as information about the information column "device ID" 10422, the information column "occurrence time" 10423, and the information column "status" 10424 illustrated in FIG. 11C mentioned above. The method of aggregating effective operation times can include subtracting, from the specific time period, the sum of times in which the printing disabled state, such as "PrinterJam" or "Malfunction" illustrated in FIG. 11C, was continuing.

After that, in step S10614, the data analysis unit 305 calculates an operation rate of the analysis target device. To perform these calculations, the rated number of printed pages acquired in step S10611, the total number of printed pages in a specific time period acquired in step S10612, and the effective operation time obtained by aggregate calculation in step S10613 are used. The printer effective operation rate is a rate representing to what extent the printer has operated in a specific time period and is obtained in the following way:

Printer effective operation rate=(Number of printed pages in specific time period)/(Rated number of printed pages per minute×Effective operation time (minutes) in specific time period).

If the specific time period is assumed to be one month, the printer effective operation rate is expressed as follows:

Printer effective operation rate=(Number of printed pages in one month)/(Rated number of printed pages per minute×Effective operation time (minutes) in one month).

While the printer effective operation rate becomes almost the same as the operation rate in the Ministry of the Environment's guideline mentioned above as follows:

Operation rate=(Monthly number of output sheets)/ (Number of output sheets per minute×60 minutes×7 hours×20 days), since, instead of the operation time in one month in the denominator being 60 minutes×7 hours×20 days, the operation rate is calculated based on the effective operation time with the downtime of the MFP 1100 taken into account, it is possible to accurately make a comparison of operation rates of the respective MFPs 1100.

Moreover, in a case where the rated number of printed pages (a predetermined number) per minute (per unit time) differs between color print and monochrome print, the printer effective operation rate is obtained in the following way:

Printer effective operation rate=(Number of color printed pages in specific time period)/(Rated number of color printed pages per minute×Effective operation time (minutes) in specific time period)+(Number of monochrome printed pages in specific time period)/(Rated number of monochrome printed pages per minute×Effective operation time (minutes) in specific time period).

Additionally, the data analysis unit 305 calculates the rate of the effective operation time to the specific time period by the following equation:

Printer effective time rate=(Effective operation time (minutes) in specific time period)/(Specific time period (minutes)).

After that, in step S10614, the data analysis unit 305 stores the printer effective operation rate and the printer effective time rate obtained in the above-described way as well as an ID for identifying the analyzed device in the analysis data storage unit 306.

After that, in step S10615, the data analysis unit 305 determines whether the aggregate calculation processing for operation rates itself has ended. Specifically, the data analysis unit 305 determines whether data for data aggregate calculation and data for analysis intervals in the aggregated information storage unit 309 are in an ineffective state. If it is determined that the aggregate calculation processing itself has ended (YES in step S10615), the control unit 120 ends a series of processing. If it is determined that the aggregate calculation processing itself has not yet ended (NO in step S10615), the control unit 120 returns the processing to step S10602.

<Operation Rates>

FIG. 14 illustrates an example of operation rate information which the server 1120 displays. This is a display example in which the effective operation rates and the effective time rates obtained by a series of processing illustrated in FIG. 13 are displayed on the operation display unit 128 of the server 1120. Instead of displaying performed by the server 1120, operation rate data stored in the analysis data storage unit 306 can be transmitted to an external information processing apparatus and be displayed there. Here, displaying of the operation rates is performed in tabular form. The operation rates and utilization rates of each MFP 1100 are displayed in each row.

An information column "device ID" 10701 represents an ID for uniquely identifying a device. An information column 10702 and an information column 10703 represent, as indicated by the respective titles in the table, the printer effective operation rate and the printer effective time rate.

In an MFP of the device ID "BBB0100" illustrated in FIG. 14, the effective time rate being 50%, i.e., one half, indicates that one half of the aggregate calculation time period was a time period in a printing disabled state due to, for example, a malfunction. In a conventional method of calculating the operation rate with a fixed time taken as the denominator, it may have been erroneously determined that the MFP of the device ID "BBB0100" was lower in operation rate than an MFP of the device ID "CCC0200", which was fully operational. In the present exemplary embodiment, calculating the effective operation rate with the downtime of the MFP 1100 taken into account as in the calculation of the effective operation time in step S10614 enables making an appropriate comparison of operation rates of the respective MFPs 1100.

The above-described third exemplary embodiment is configured to obtain the effective operation rate with the downtime taken into account with respect to a printing operation. A fourth exemplary embodiment is configured to obtain the operation rate of the whole MFP 1100 in consideration of not only a printing operation in the MFP 1100 but also an execution of a job in which the scanner operates. The configuration of an information processing system according to the fourth exemplary embodiment is similar to that in the third exemplary embodiment except for components related to the above-mentioned characteristic portions. Therefore, similar components are assigned the respective same reference characters, and the detailed description thereof is omitted.

<Notification Events>

FIG. 15 is a diagram illustrating examples of notification events each of which is transmitted from MFP 1100 to the server 1120 in the fourth exemplary embodiment. While, as with FIG. 11C, an actual notification event is data which is transmitted in a format such as JSON or XML, here, for ease of explanation, the content of data is expressed in tabular form. Moreover, likewise, each row represents one notification event.

An information column "event name" 10801, an information column "device ID" 10802, and an information column "occurrence time" 10803 are similar to those illustrated in FIG. 11C.

An information column "unit" 10804 represents the type of a unit, such as the printer 113 or the scanner 112, which is a component of the MFP 1100.

In a case where the information column "unit" 10804 indicates "Printer", a state change in the printer 113 is shown, and, in a case where the information column "unit" 10804 indicates "Scanner", a state change in the scanner 112 is shown. An information column "status" 10805, which is similar to that illustrated in FIG. 11C, additionally includes, in FIG. 15, "ScannerJam", which indicates a state concerning "Scanner". For example, with regard to a StatusChanged event of No. 4 in FIG. 15, the following is found. Thus, in an MFP 1100 in which the information column "device ID" 10802 indicates "AAA0001", the information column "status" 10805 indicates "Malfunction", i.e., the MFP 1100 being malfunctioning.

Moreover, in a StatusChanged event of No. 10 illustrated in FIG. 15, the information column "status" 10805 of the canner 112 of an MFP 1100 indicated by "CCC0200" of the information column "device ID" 10802 indicates "ScannerJam", i.e., a jam occurring in the scanner 112. In the MFP 1100 in the present exemplary embodiment, the scanner 112 and the printer 113 are able to operate independent from each other, so that, for example, even when the printer 113 is malfunctioning, a job requiring the use of the scanner 112 is executable. In each StatusChanged event illustrated in FIG. 15, it is possible to acquire information indicating whether each unit, such as the printer 113 or the scanner 112, which is a component of the MFP 1100, was in an operable state.

While event transmission processing which the MFP 1100 performs in the fourth exemplary embodiment is almost the same as the processing in the MFP 1100 in the third exemplary embodiment illustrated in FIG. 12, the above-mentioned information column "unit" 10804 is added as device state change acquisition in step S10508 illustrated in FIG. 12.

<Processing Flow of Server 1120>

Figure 16:
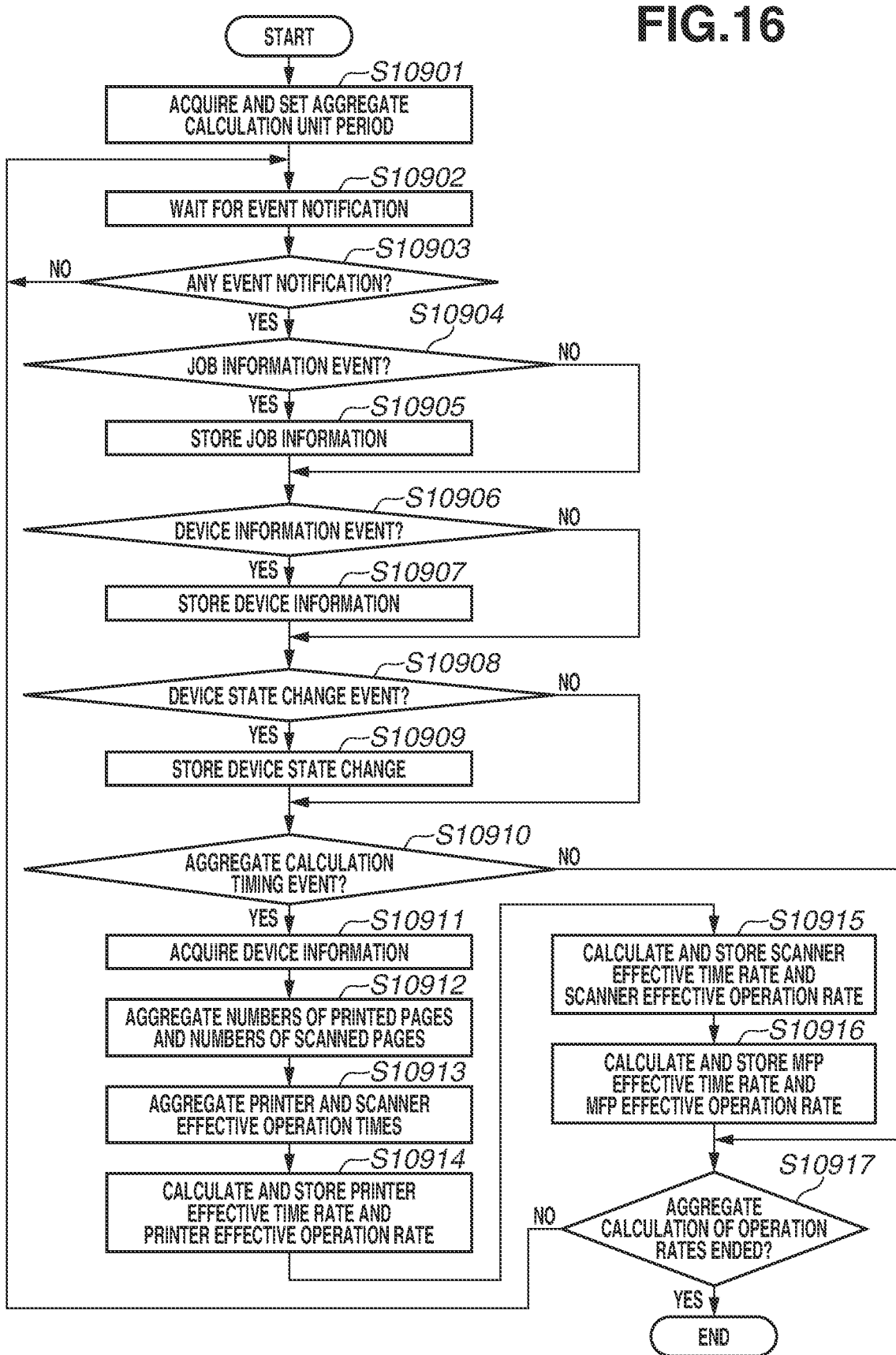
FIG. 16 is a flowchart illustrating processing which the server performs according to one or more aspects of the present disclosure.

FIG. 16 is a flowchart illustrating processing which the server 1120 performs in the fourth exemplary embodiment. Each step in the flowchart of FIG. 16 is processed by the CPU 121 executing a control program stored in the HDD 124.

Processing in step S10901 to step S10910 illustrated in FIG. 16 is the same as the execution processing performed by the server 1120 in the third exemplary embodiment illustrated in FIG. 13, and, therefore, the description thereof is omitted.

If, in step S10910, it is determined that the received event is an analysis timing event (YES in step S10910), the data analysis unit 305 specifies an MFP 1100 targeted for analysis. Additionally, in step S10911, the control unit 120 acquires, from the device information storage unit 304, information about the rated number of printed pages and the rated number of scanned pages of the MFP 1100 targeted for analysis based on the information column "device ID" 10412 of the MFP 1100 targeted for analysis.

Next, the data analysis unit 305 acquires, from the acquired data storage unit 303, information about the information column "number of printed pages" 10407 and the information column "number of scanned pages" 10409 based on the device ID of the MFP 1100 targeted for analysis. Additionally, in step S10912, the control unit 120 obtains the respective cumulative numbers of pages from the numbers of printed pages and the numbers of scanned pages of the analysis target device in a specific time period. Specifically, the control unit 120 is able to obtain the respective cumulative numbers of pages by adding together values of the information column "number of printed pages" 10407 and adding together values of the information column "number of scanned pages" 10409 based on information about the information column "device ID" 10402 and the information column "occurrence time" 10403.

In step S10913, the data analysis unit 305 calculates effective operation times of the MFP 1100 targeted for analysis.

While the method of calculating the effective operation times is the same as that in step S10613, the data analysis unit 305 calculates a scanner effective operation time and a printer effective operation time by adding together times in which the respective units, i.e., the scanner 112 and the printer 113, were able to operate based on information about the information column "unit" 10804 illustrated in FIG. 15.

In step S10914, the data analysis unit 305 calculates and stores a printer effective time rate and a printer effective operation rate. The method of calculation is the same as that for calculating an effective operation rate and an effective time rate in step S10614 except for the use of the printer effective operation time for the printer 113 calculated in step S10913, and, therefore, the description thereof is omitted.

In step S10915, the data analysis unit 305 calculates and stores a scanner effective time rate and a scanner effective operation rate.

First, the data analysis unit 305 performs calculations using the following formulae based on the rated number of scanned pages acquired in step S10911, the cumulative number of scanned pages in the specific time period obtained in step S10912, and the scanner effective operation time calculated in step S10913:

In the case of the rated number of scanned pages being the same between color and monochrome, Scanner effective operation rate=(Number of scanned pages in specific time period)/(Rated number of scanned pages per minute×Scanner effective operation time (minutes) in specific time period).

In the case of the rated number of scanned pages being different between color and monochrome, Scanner effective operation rate=(Number of color scanned pages in specific time period)/(Rated number of color scanned pages per minute× Scanner effective operation time (minutes) in specific time period)+(Number of monochrome scanned pages in specific time period)/(Rated number of monochrome scanned pages per minute×Scanner effective operation time (minutes) in specific time period).

Additionally, the data analysis unit 305 calculates the rate of the effective operation time to the specific time period by the following equation:

Scanner effective time rate=(Scanner effective operation time (minutes) in specific time period)/ (Specific time period (minutes)).

Additionally, the data analysis unit 305 stores the scanner effective operation rate and the scanner effective time rate calculated in the above-described way as well as an ID for identifying the device targeted for analysis in the analysis data storage unit 306.

In step S10916, the data analysis unit 305 sums the printer effective time rate and the scanner effective time rate calculated in step S10914 and step S10915 to obtain an MFP effective time rate and stores the MFP effective time rate as well as an ID for identifying the device targeted for analysis in the analysis data storage unit 306.

Additionally, the data analysis unit 305 averages the scanner effective operation rate and the printer effective operation rate to obtain an MFP effective operation rate and stores the MFP effective operation rate as well as an ID for identifying the device targeted for analysis in the analysis data storage unit 306. After that, the data analysis unit 305 performs processing in step S10917 and subsequent steps, which is the same as processing in step S10615 and subsequent steps illustrated in FIG. 13 and is, therefore, omitted from description.

<Operation Rates>

FIG. 17 illustrate examples of operation rates which the server 1120 in the fourth exemplary embodiment displays.

This is a display example in which the effective operation rates and the effective time rates obtained by a series of processing illustrated in FIG. 16 are displayed on the operation display unit 128 of the server 1120. Here, displaying of the effective operation rates and the effective time rates is performed in tabular form as with the example illustrated in FIG. 14.

An information column "printer effective operation rate" 11002 and an information column "printer effective time rate" 11003 are similar to those illustrated in FIG. 14 as an example. In FIG. 17, in addition to these, an information column "scanner operation rate" 11004, an information column "scanner effective time rate" 11005, an information column "MFP effective operation rate" 11006, and an information column "MFP effective time rate" 11007 are additionally displayed.

In FIG. 17, for example, in the case of comparing operation rates for only printers, the MFP of No. 3 is long in the downtime of the printer and is low in the printer effective operation rate. However, it is found that the MFP of No. 3 is high in the operation rate of the scanner and is higher in the scanner effective operation rate and the MFP effective operation rate than the MFP of No. 1.

<Remarks>

In the above-described way, in the fourth exemplary embodiment, it is possible to calculate operation rates with a situation in which the printer or the scanner is not able to be used due to, for example, a malfunction thereof taken into account. This enables comparing the respective MFPs 1100 by higher-accuracy operation rates consistent with actual usages of the respective MFPs 1100. As a result, it is possible to increase the convenience of a service such as management and replacement of devices.

<Notification Events>

FIGS. 18A and 18B are diagrams schematically illustrating example of notification events which are transmitted from the MFP 1100 to the server 1120 in a fifth exemplary embodiment. Here, two types of notification events related to the fifth exemplary embodiment among the notification events which are transmitted from the MFP 1100 to the server 1120 are described with reference to FIGS. 18A and 18B.

FIG. 18A illustrates examples of notification events which are recorded when various types of jobs have been completed in the MFP 1100 and are transmitted to the server 1120. While an actual notification event is data which is transmitted in a format such as JSON or XML, here, for ease of explanation, the content of data is expressed in tabular form. Each row represents one notification event.

An information column "event name" 20401 represents the name of an event which is transmitted. A "JobCompleted" event is an event indicating the completion of a job. This is one of events which are transmitted when a transmission request for information about a job has been received from the server 1120. While, actually, an event indicating the start of a job is also transmitted, the description thereof is omitted here.

An information column "device ID" 20402 represents an ID for uniquely identifying a device such as the MFP 1100.

An information column "occurrence time" 20403 represents the time of occurrence of a phenomenon in the applicable event. In this case, the time of occurrence is almost the same as the time of completion of a job represented by the applicable event.

An information column "job ID" 20404 represents an ID for uniquely identifying a job in the same device. Usually, the job ID is a numerical value which is incremented by one for each execution of a job.

An information column "job type" 20405 represents the type of a job, such as copy and print.

An information column "print color mode" 20406 represents with which of color and monochrome printing has been performed in the case of a job accompanied by printing.

An information column "number of printed sheets" 20407 represents the number of actually printed sheets (the number of processing operations performed for print processing), which is incremented in the case of a job accompanied by printing.

An information column "print speed" 20408 represents a print speed actually used for printing, as the number of sheets which are able to be output (processable) per minute, in the case of a job accompanied by printing. As mentioned above, the print speed used for printing differs depending on the size or type of paper actually used for printing. Therefore, the event collection unit 209 acquires information about a print speed used for the applicable job from the function application 207 used for printing or the history setting holding unit 208 with job information recorded thereon, and adds the acquired information to the information column "print speed" 20408.

FIG. 18B illustrates examples of notification events which are periodically recorded concerning device information about the MFP 1100 and are then transmitted to the server 1120. Again, while an actual notification event is also data which is transmitted in a format such as JSON or XML, here, for ease of explanation, the content of data is expressed in tabular form. Moreover, each row represents one notification event.

An information column "event name" 20411 represents the name of an event which is transmitted. A "BasicInfoSnapshotted" event is an event which is periodically transmitted about basic information about each device. This is one of events which are transmitted when a transmission request for information concerning device information about devices has been received from the server 1120. While, actually, besides, an event indicating a change of the device information is also transmitted, the description thereof is omitted here.

An information column "device ID" 20412 represents an ID for uniquely identifying a device such as the MFP 1100.

An information column "occurrence time" 20413 represents the time of occurrence of a phenomenon in the applicable event. In this case, the time of occurrence is the time at which the device information was internally acquired, which occurs periodically.

An information column "printer type" 20414 represents the type of a printer included in a device such as the MFP 1100, and indicates one of a color printer and a monochrome printer.

An information column "rated number of color printed sheets" 20415 represents the rated number of color printed sheets which are able to be output per minute in a case where the printer is a color printer.

An information column "rated number of monochrome printed sheets" 20416 represents the rated number of monochrome printed sheets which are able to be output per minute by the printer. In this way, the information column 20412 to the information column 20416 of this event enable knowing information such as the rated number of printed sheets concerning a device such as the MFP 1100. While such information added to each event includes, besides the information column 20412 to the information column 20416, various pieces of information about a device, the description thereof is omitted here.

With regard to data about notification events illustrated in FIG. 18B, one of the function applications 207 periodically acquires device information at a previously designated time interval and communicates the acquired device information to the event collection unit 209. The event collection unit 209 transmits this notification event to the server 1120 via the event transmission unit 211. In the server 1120, upon receiving this event, the data shaping unit 302 discriminates the event and then stores the event in the device information storage unit 304. Moreover, the data analysis unit 305 performs filtering of data stored in the device information storage unit 304 based on information in the information column "device ID" 20412. Then, the data analysis unit 305 acquires the latest information based on information in the information column "occurrence time" 20413, thus acquiring the latest information about the device.

<Processing Flow of MFP 1100>

As illustrated in FIG. 5, first, in step S501, the event collection unit 209 waits for reception of an internal event from an internal function module.

Next, in step S502, the event collection unit 209 determines whether an internal event for a transmission processing target has been received from an internal function module. Specifically, the event collection unit 209 determines, based on information about a transmission target event stored in the notification setting holding unit 203, whether the received event is an internal event corresponding to the transmission target event. If it is determined that the internal event has not been received (NO in step S502), the controller unit 100 returns the processing to step S501.

If, in step S502, it is determined that an internal event for a transmission processing target has been received from an internal function module (YES in step S502), then in step S503, the event collection unit 209 determines whether the received internal event is a job ending event. If it is determined that the received internal event is not a job ending event (NO in step S503), the controller unit 100 advances the processing to step S505.

If, in step S503, it is determined that the received internal event is a job ending event (YES in step S503), then in step S504, the controller unit 100 acquires information about a job and generates a transmission event. Specifically, the controller unit 100 acquires information equivalent to the information column of a JobCompleted event illustrated in FIG. 18A from, for example, an information column about a job added to the internal event or information stored in the history setting holding unit 208. At this time, in the case of a job accompanied by printing, the controller unit 100 acquires information about the information column "print color mode" 20406, the information column "number of printed sheets" 20407, and the information column "print speed" 20408 such as those illustrated in FIG. 18A. Additionally, the controller unit 100 shapes the acquired information into a data format of the JobCompleted event, and stores the generated JobCompleted event as a file in the message buffer 210. Here, the event collection unit 209 previously stores a setting as to an ending event of what job type to generate as a transmission event. Alternatively, a method of receiving a designation of a job type from the server 1120, storing such information in the notification setting holding unit 203, and generating a transmission event of the designated job type based on such information can be employed.

Next, in step S505, the event collection unit 209 determines whether the received internal event is a timing event for device information transmission. If it is determined that the received internal event is not a timing event for device information transmission (NO in step S505), the controller unit 100 advances the processing to step S507.

If, in step S505, it is determined that the received internal event is a timing event for device information transmission (YES in step S505), then in step S506, the controller unit 100 acquires information about a device and generates a transmission event. Specifically, the controller unit 100 acquires information equivalent to the information column of a BasicInfoSnapshotted event illustrated in FIG. 18B from, for example, the function applications 207 or the history setting holding unit 208. Additionally, the controller unit 100 shapes the acquired information into a data format of the BasicInfoSnapshotted event, and stores the generated BasicInfoSnapshotted event as a file in the message buffer 210.

Next, in step S507, the event transmission unit 211 transmits the transmission event stored in the message buffer 210 to the server 1120 via the network communication unit 201.

After that, in step S508, the event collection unit 209 determines whether the event transmission processing itself to the server 1120 has ended. Specifically, the event collection unit 209 determines whether there is a transmission target event in the notification setting holding unit 203. In a case where there is no transmission target event in the notification setting holding unit 203, the event collection unit 209 determines that the event transmission processing itself has ended (YES in step S508), and then ends a series of processing. In a case where there is a transmission target event, the event collection unit 209 determines that the event transmission processing is still continuing (NO in step S508), and the controller unit 100 then returns the processing to step S501.

In this way, transmission events such as those illustrated in FIGS. 18A and 18B are communicated from the MFP 1100 to the server 1120.

<Processing Flow of Server 1120>

FIG. 19 is a flowchart illustrating processing which the server 1120 performs in the fifth exemplary embodiment. Each step in the flowchart of FIG. 19 is processed by the CPU 121 executing a control program stored in the HDD 124. Thus, each processing is performed by the control unit 120. Here, reception of an event and analysis processing of data which the server 1120 performs are described in detail.

First, in step S20601, the data analysis unit 305 instructs the aggregated information storage unit 309 to acquire data about intervals of data aggregate calculation and analysis and instructs the timer control unit 308 to communicate analysis timing at every such interval. Additionally, the notification data generation unit 310 generates, from analysis target data information stored in the aggregated information storage unit 309, an event notification request to the MFP 1100, and transmits the event notification request to the MFP 1100 via the network communication unit 301.

Next, in step S20602, the data shaping unit 302 and the data analysis unit 305 wait for reception of a transmission event from the MFP 1100 and reception of an analysis timing event from the timer control unit 308.

Additionally, in step S20603, the control unit 120 determines whether the transmission event from the MFP 1100 or the analysis timing event from the timer control unit 308 has been received. If it is determined that no event has been received (NO in step S20603), the control unit 120 returns the processing to step S20602.

If, in step S20603, it is determined that an event has been received (YES in step S20603), then in step S20604, the data shaping unit 302 determines whether the received event is an event concerning job information transmitted from the MFP 1100. Specifically, the data shaping unit 302 determines whether the received event is a JobCompleted event based on information about the information column "event name" 20401 illustrated in FIG. 18A and the information column "event name" 20411 illustrated in FIG. 18B. If it is determined that the received event is not an event concerning job information (NO in step S20604), the control unit 120 advances the processing to step S20606.

If, in step S20604, it is determined that the received event is an event concerning job information (YES in step S20604), then in step S20605, the data shaping unit 302 shapes data about the event and then stores the shaped data in the acquired data storage unit 303.

Next, in step S20606, the control unit 120 determines whether the received event is an event concerning device information transmitted from the MFP 1100. Specifically, the control unit 120 determines whether the received event is a BasicInfoSnapshotted event based on information about the information column "event name" 20401 illustrated in FIG. 18A and the information column "event name" 20411 illustrated in FIG. 18B. If it is determined that the received event is not an event concerning device information (NO in step S20606), the control unit 120 advances the processing to step S20608.

If, in step S20606, it is determined that the received event is an event concerning device information (YES in step S20606), then in step S20607, the data shaping unit 302 shapes data about the event and then stores the shaped data in the device information storage unit 304.

Additionally, in step S20608, the control unit 120 determines whether the received event is an analysis timing event transmitted from the timer control unit 308. If it is determined that the received event is not an analysis timing event (NO in step S20608), the control unit 120 advances the processing to step S20614. If, in step S20608, it is determined that the received event is an analysis timing event (YES in step S20608), the data analysis unit 305 specifies an MFP 1100 targeted for analysis.

Additionally, in step S20609, the control unit 120 acquires, from the device information storage unit 304, information about the rated number of printed sheets of the MFP 1100 targeted for analysis based on the device ID of the MFP 1100 targeted for analysis.

Moreover, in step S20610, the data analysis unit 305 acquires, from the acquired data storage unit 303, information about the number of printed sheets and the print speed of each job executed in a specific time period based on the device ID of the MFP 1100 targeted for analysis.

Additionally, in step S20611, the control unit 120 obtains a job operation rate for each of all of the jobs executed in the specific time period. The control unit 120 obtains the job operation rate based on the number of printed sheets and the print speed of each job acquired in step S20610 in the following way:

Job operation rate=(Number of printed sheets in job)/(Number of printed sheets per minute in job×Fraction in specific time period).

Here, the number of printed sheets per minute (unit time) and the print speed are synonymous with each other.

If the specific time period is assumed to be a month (one month), the job operation rate becomes as follows:

Job operation rate=(Number of printed sheets in job)/(Number of printed sheets per minute in job×60 minutes×24 hours×Number of days in one month).

Here, since the fraction in the specific time period becomes the same value with respect to any device, with regard to the purpose of making a comparison between devices, there is no problem even if 24 hours is assumed to be 7 hours, which is office's average working hours, and the number of days of one month is assumed to be 20 days.

After obtaining a job operation rate for each of all of the jobs executed in the specific time period, next, in step S20612, the control unit 120 obtains an operation rate of the analysis target device in the specific time period. The control unit 120 obtains the device operation rate based on the job operation rate for each job obtained in step S20611 in the following way:

$$\text{Operation rate} = \sum_{job}^{all\ jobs\ in\ specific\ time\ period} \text{Job operation rate.}$$

Thus, the device operation rate is obtained by summing the job operation rates for all of the jobs in the specific time period. The data analysis unit 305 stores the thus-obtained operation rate as well as an ID for identifying the analyzed device in the analysis data storage unit 306.

Moreover, in step S20613, the control unit 120 obtains a rated output rate indicating to what extent printing has been performed with the rated number of printed sheets in jobs in the specific time period.

Specifically, the control unit 120 first obtains a rated operation rate based on information about the rated number of printed sheets acquired in step S20609, and then obtains the rated output rate based on the operation rate obtained in step S20612 in the following way:

Rated operation rate=(Total number of printed sheets in specific time period)/(Rated number of printed sheets per minute×Fraction in specific time period), and Rated output rate=(Rated operation rate)/(Operation rate).

If the specific time period is assumed to be one month and is further assumed to be 60 minutes×7 hours×20 days, which is office's average working hours, the rated operation rate becomes almost the same as the operation rate in the Ministry of the Environment's guideline mentioned above as follows:

Operation rate=(Monthly number of output sheets)/ (Number of output sheets per minute×60 minutes×7 hours×20 days).

Thus, the rated output rate is a ratio indicating how the rated operation rate deviates from such a conventional operation rate, and serves as a rough indication as to how printing was performed with a paper size, paper type, and print setting different from the standard ones. Since, usually, in the case of printing using a special paper size or paper type, the number of printable sheets becomes smaller than the rated number of printed sheets, as the rated output rate becomes smaller, the rate at which printing using, for example, a special paper size was performed becomes larger.

The data analysis unit 305 stores the thus-obtained rated output rate as well as an ID for identifying the analyzed device in the analysis data storage unit 306.

After that, in step S20614, the data analysis unit 305 determines whether the aggregate calculation processing for operation rates itself has ended. Specifically, the data analysis unit 305 determines whether data for data aggregate calculation and data for analysis intervals in the aggregated information storage unit 309 are in an ineffective state. If it is determined that the aggregate calculation processing itself has ended (YES in step S20614), the control unit 120 ends a series of processing. If it is determined that the aggregate calculation processing itself has not yet ended (NO in step S20614), the control unit 120 returns the processing to step S20602.

<Operation Information>

FIG. 20 illustrates an example of operation information which the server 1120 displays. This is a display example in which the operation rates and the rated output rates obtained by a series of processing illustrated in FIG. 19 are displayed on the operation display unit 128 of the server 1120. Instead of displaying performed by the server 1120, data about, for example, operation rates stored in the analysis data storage unit 306 can be transmitted to an external information processing apparatus and be displayed there. Here, displaying of the operation information is performed in tabular form. The operation rate and rated output rate of each MFP 1100 are displayed in each row.

An information column "device ID" 20701 represents an ID for uniquely identifying a device.

An information column 20702 to an information column 20707 represent, as indicated by the respective titles in the table, the number of color printed sheets, the number of monochrome printed sheets, the rated umber of color printed sheets, the rated number of monochrome printed sheets, an operation rate, and a rated output rate, respectively.

Moreover, although not being actually displayed, for ease of explanation, an information column "rated operation rate" 20708 is illustrated. The information column "rated operation rate" 20708 represents the same operation rates as those in the Ministry of the Environment's guideline mentioned above, and can be mentioned as conventional operation rates. Here, the information column "operation rate" 20706, the information column "rated output rate" 20707, and the information column "rated operation rate" 20708 represent values obtained by performing calculations with the specific time period set as one month and the fraction in the specific time period set as 60 minutes×7 hours×20 days in conformity with the Ministry of the Environment's guideline.

Additionally, the device of No. 2 is assumed to be a device in which all of the jobs were executed with the rated number of printed sheets.

The device of No. 1 is assumed to be a device in which, in jobs which output one half of the number of monochrome printed sheets, printing was performed at a speed corresponding to one half of the rated number of printed sheets. The device of No. 3 is assumed to be a device in which, in all of the jobs, printing was performed with use of, for example, a paper size different from the standard size and at a speed corresponding to one half of the rated number of printed sheets.

In such a case, in comparison with regard to the information column "rated operation rate" 20708, i.e., conventional operation rates, the operation rate of the device of No. 2 is the highest, and a difference between the operation rate of the device of No. 2 and the operation rate of the device of No. 3 is large. However, in comparison with regard to the information column "operation rate" 20706 in the present exemplary embodiment, the operation rate of the device of No. 1 is the highest, and a difference between the operation rate of the device of No. 2 and the operation rate of the device of No. 3 is not so large. This is because the operation rate in the present exemplary embodiment is a value obtained in consideration of the actual print speed, and the information column "operation rate" 20706 correctly represents a rate at which the printer actually operated.

Moreover, viewing the information column "rated output rate" 20707 reveals that the device of No. 1 and the device of No. 3 performed much printing with settings different from the standard ones. This becomes a help in considering how the printer is used by the user, when the printer or the MFP 1100 is to be replaced or rearranged, by examining the setting content of the printer in more detail.

<Remarks>

In the above-described way, it is possible to recognize the operation rate of the printer or the MFP 1100 obtained in consideration of the print speed for each job, which is conventionally not able to be found by the operation rate obtained in consideration of only the standard print, and, thus, it is possible to compare operation rates of the respective printers or MFPs 1100. This enables comparing the respective printers or MFPs 1100 by higher-accuracy operation rates consistent with actual usages of the respective printers or MFPs 1100, and thus enables increasing the convenience for providing services such as management and replacement of devices.

The above-described fifth exemplary embodiment is configured to obtain respective operation rates with respect to a plurality of types of print processing differing in print speed of the MFP 1100. A sixth exemplary embodiment is configured to also obtain an operation rate of the printer in consideration of a case where the print speed has changed in the middle of a job for performing printing. The configuration of an information processing system according to the sixth exemplary embodiment is similar to that in the fifth exemplary embodiment except for components related to the above-mentioned characteristic portions. Therefore, similar components are assigned the respective same reference characters, and the detailed description thereof is omitted.

<Notification Events>

FIG. 21 is a diagram schematically illustrating examples of notification events each of which is transmitted from MFP 1100 to the server 1120 in the sixth exemplary embodiment. While, as with FIGS. 18A and 18B, an actual notification event is data which is transmitted in a format such as JSON or XML, here, for ease of explanation, the content of data is expressed in tabular form. Moreover, likewise, each row represents one notification event.

Information about an information column "event name" 20801 to an information column "print speed" 20808 is similar to information about the information column "event name" 20401 to the information column "print speed" 20408 illustrated in FIG. 18A.

Additionally, information about an information column "second print color mode" 20809, an information column "number of second printed sheets" 20810, and an information column "second print speed" 20811 is added. These information columns are the same in meaning as the information column "print color mode" 20806, the information column "number of printed sheets" 20807, and the information column "print speed" 20808. Thus, a plurality of pieces of print information is added to one piece of job information. Mainly, in a print job using, for example, a page description language (PDL), it is possible to perform a designation of printing, such as changing of a paper size or changing of a print setting value, in the middle of a job. In a case where these changes of settings are accompanied by changing of a print speed, printing is performed at a plurality of print speeds even in a single job, so that a difference occurs between the operation rate obtained by calculation and the actual print operation state. Therefore, in a case where, in a job accompanied by printing, the print speed has been changed in the middle of a job, information about the print color mode, the number of printed sheets, and the print speed obtained at the time of this change is added as the information column 20809 to the information column 20811.

For example, in a job corresponding to a JobCompleted event of No. 3, it is found that a print job was executed to output two color printed sheets at a print speed of 60 sheets per minute and two color printed sheets at a print speed of 30 sheets per minute. Furthermore, in a case where the print speed has been changed three or more times in the middle of a job accompanied by printing, information about the third or subsequent print color mode, the number of third or subsequent printed sheets, and the third or subsequent print speed is added, but an example of such a case is omitted from description.

<Processing Flow of Server 1120>

Figure 22:
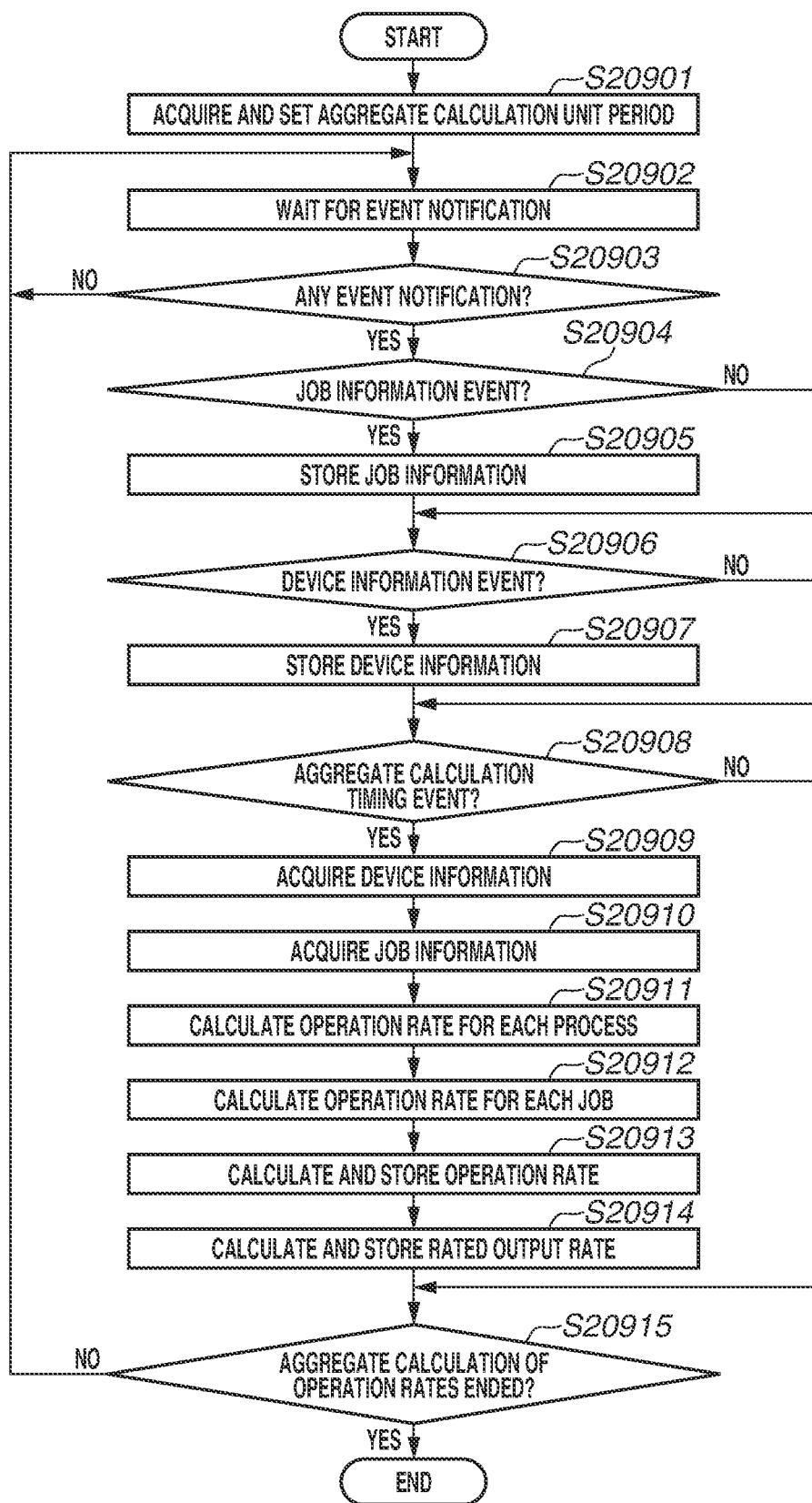
FIG. 22 is a flowchart illustrating processing which the server performs according to one or more aspects of the present disclosure.

FIG. 22 is a flowchart of processing which the server 1120 in the sixth exemplary embodiment performs. Each step in the flowchart of FIG. 22 is processed by the CPU 121 executing a control program stored in the HDD 124.

Processing in step S20901 to step S20910 in FIG. 22 is the same as execution processing in step S20601 to step S20610 illustrated in FIG. 19, which the server 1120 in the fifth exemplary embodiment performs, and, therefore, the description thereof is omitted here.

In step S20911, the data analysis unit 305 calculates an operation rate in each of cases where printing was performed at different speeds for respective jobs in a specific time period, based on the job information acquired in step S20910. In a case where, in a single job, a plurality of print processing operations differing in print speed has been performed, each print processing operation is referred to as a "process" for convenience of explanation, the print speed in the process is referred to as a "process speed", and the operation rate in the process is referred to as a "process operation rate". The data analysis unit 305 obtains the process operation rate in a given job in the following way:

Process operation rate=(Number of printed sheets in process)/(Number of printed sheets per minute in process×Fraction in specific time period).

Here, the number of printed sheets per minute in process and the process speed are synonymous with each other.

Additionally, in step S20912, the data analysis unit 305 obtains a job operation rate based on the process operation rate. Specifically, the data analysis unit 305 obtains the job operation rate based on the process operation rate obtained in step S20911 in the following way:

$$\text{Job operation rate} = \sum_{process}^{all\ processes\ in\ job} \text{Process operation rate}.$$

In this way, the job operation rate in the sixth exemplary embodiment is obtained by summing the process operation rates in the applicable job.

Processing for calculating and storing the operation rate and the rated output rate in step S20913 and subsequent steps, which is performed after the operation rate for each job is obtained in step S20912, is the same as the processing in step S20612 and subsequent steps in the fifth exemplary embodiment illustrated in FIG. 19, and, therefore, the description thereof is omitted.

<Operation Information>

FIG. 23 illustrates an example of operation information which the server 1120 displays in the sixth exemplary embodiment.

Display items including an information column "device ID" 21001 to an information column "rated output rate" 21007 are the same as the information column 20701 to the information column 20707 illustrated in FIG. 20. Moreover, although not being actually displayed, for ease of explanation, an information column "rated operation rate" 21008 is also illustrated.

In a device of No. 1 to a device of No. 3, the number of color printed sheets and the number of monochrome printed sheets in a specific time period are the same as those illustrated in FIG. 20, and the fraction in the specific time period for use in operation rate calculation is also the same. Additionally, in the device of No. 1 and the device of No. 2, the print condition remains the same as that described with reference to FIG. 20, and both the operation rate and the rated output rate are the same as those illustrated in FIG. 20.

In the device of No. 3 illustrated in FIG. 20, a condition in which all of the jobs were executed at one half of the rated print speed is set. On the other hand, in the device of No. 3 illustrated in FIG. 23, a condition in which jobs which output one half of all of the printed sheets were executed at one half of the rated print speed is set. Additionally, a condition in which the remaining half of jobs were executed with printing at one half of the rated print speed and printing at one fourth of the rated print speed outputting the same number of printed sheets is set. Thus, in terms of processes, a process which output three fourths of all of the number of printed sheets in the specific time period operated at a process speed which was one half of the rated print speed, and a process which output one fourth of all of the number of printed sheets in the specific time period operated at a process speed which was one fourth of the rated print speed.

In this case, although the information column "number of color printed sheets" 21002, the information column "number of monochrome printed sheets" 21003, and the information column "rated operation rate" 21008, which indicates conventional operation rates, are unchanged, the information column "operation rate" 21006 of the device of No. 3 becomes the highest. Moreover, it is found that the information column "rated output rate" 21007 of the device of No. 3 becomes lower than that illustrated in FIG. 20. The device of No. 3 performed a large number of print processing operations low in process speed, so that, although the number of printed sheets output thereby is unchanged, the rate at which the device of No. 3 operated becomes high.

In the above-described way, in the sixth exemplary embodiment, even in a case where print processing operations were performed at respective different process speeds in respective jobs accompanied by printing, it is possible to correctly reflect the actual usage at that time in each operation rate. Accordingly, even in a case where there is a printer which executes a large number of print jobs in each of which a plurality of paper sizes or a plurality of print settings is used, it is possible to compare printers or MFPs 1100 based on high-accuracy operation rates consistent with the actual usage of each printer or MFP 1100. As a result, it is possible to increase the convenience for management and replacement of devices.

<Remarks>

As described above, in the sixth exemplary embodiment, even in an MFP 1100 in which processing not using a printer or a scanner is performed, it is possible to correctly reflecting the actual usage thereof in the operation rate of the MFP 1100. Accordingly, even in a case where there is an MFP 1100 in which processing not using a printer or a scanner is performed, it is possible to compare MFPs 1100 based on high-accuracy operation rates consistent with the actual usage of each MFP 1100. As a result, it is possible to increase the convenience for providing services such as management and replacement of devices.

Other Embodiments

The present disclosure is not limited to the above-described exemplary embodiments, but can be modified in various fashions (including an organic combination of some exemplary embodiments) based on the gist of the present disclosure and is not construed to exclude such modifications from the scope of the present disclosure. Thus, all of the configurations obtained by combining some of the above-described exemplary embodiments and their modification examples are also included in the present disclosure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

Moreover, the present disclosure can be applied to a system including a plurality of devices and can be applied to an apparatus including a single device. For example, a part of software modules can be configured to be executed by an external server, and functions thereof can be implemented by acquiring a result of processing performed by the external server. For example, while, in the first and second exemplary embodiments, calculation of operation rates is performed by the server 1120, a system configuration in which such calculation is completed in the MFP 1100, i.e., a configuration in which the MFP 1100 performs calculation of operation rates, can be employed. Moreover, while a configuration in which a result of calculation of operation rates is displayed on the operation display unit 128 of the server 1120 is described as an example, a configuration in which such a result is displayed on the operation unit 111 of the MFP 1100 can be employed.

While the present disclosure has been described with reference to exemplary embodiments, the scope of the following claims are to be accorded the broadest interpretation so as to encompass all such modifications and equivalent structures and functions.

What is claimed is:

1. An information processing system comprising:
a printer configured to perform print processing of printing image data on a print medium; and
one or more controllers configured to:
acquire a number of times of printing per unit time period of the print processing, and
based on a first sum number of times that is a sum of the number of times of execution of the print processing in a first predetermined time period and based on the number of times of execution per unit time period of the print processing and based on the first predetermined time period, notify an execution status of the print processing in a device including the printer.

2. The information processing system according to claim 1, wherein the execution status of the print processing in the device including the printer is a result of dividing the first sum number of times by the number of times of execution per unit time period of the print processing and by the first predetermined time period.

3. The information processing system according to claim 2, wherein based on a number of times of execution of task processing unrelated to the print medium, an execution status of the task processing in the device including the printer is notified.

4. The information processing system according to claim 3, wherein the one or more controllers are further configured to:
based on a second sum number of times that is a sum of the number of times of execution of the task processing in a second predetermined time period and based on the second predetermined time period, the execution status of the task processing in the device including the printer is notified.

5. The information processing system according to claim 4, wherein the execution status of the task processing in the device including the printer is a result of dividing the second sum number of times by the second predetermined time period.

6. The information processing system according to claim 5, further comprising:
a scanner configured to read an original and generate image data, wherein
based on a number of times of execution of read processing executed by the scanner, an execution status of the read processing in a device including the printer and the scanner is notified.

7. The information processing system according to claim 6, wherein
the one or more controllers are further configured to:
based on a third sum number of times that is a sum of the number of times of execution of the read processing in a third predetermined time period and based on the number of times of execution per unit time period of the read processing and based on the third predetermined time period, notify the execution status of the read processing in the device including the printer and the scanner.

8. The information processing system according to claim 7, wherein the execution status of the read processing in the device including the printer is a result of dividing the third sum number of times by the number of times of execution per unit time period of the read processing and by the second predetermined time period.

9. The information processing system according to claim 8, wherein
the one or more controllers are further configured to:
notify an execution status of the device, and
the execution status of the device is a result of dividing, by three, a sum of the execution status of the task processing, the execution status of the print processing, and the execution status of the read processing.

10. The information processing system according to claim 9, wherein each of the number of times of execution per unit time period of the read processing, the number of times of execution per unit time period of the print processing, and the number of times of execution per unit time period of the task processing is a number of times per month.

11. The information processing system according to claim 9, wherein the one or more controllers are capable of notifying a device different from the device of the execution status in the device, the execution status of the task processing, the execution status of the print processing, and the execution status of the read processing.

* * * * *